(12) United States Patent
Kaitha et al.

(10) Patent No.: US 11,568,371 B2
(45) Date of Patent: Jan. 31, 2023

(54) AGGREGATOR SERVER AND METHOD FOR GENERATING UNIQUE IDENTIFIERS FOR PROCESSING PAYMENTS FROM DIFFERENT PAYMENT INSTRUMENTS

(71) Applicant: Mastercard International Incorporated, New York, NY (US)

(72) Inventors: Selwyn Kaitha, Mumbai (IN); Amitabh Khanna, Navi Mumbai (IN)

(73) Assignee: Mastercard International Incorporated, New York, NY (US)

( * ) Notice: Subject to any disclaimer, the term of this patent is extended or adjusted under 35 U.S.C. 154(b) by 0 days.

(21) Appl. No.: 17/394,111

(22) Filed: Aug. 4, 2021

(65) Prior Publication Data

US 2022/0044212 A1     Feb. 10, 2022

(30) Foreign Application Priority Data

Aug. 6, 2020 (IN) .............................. 202041033642

(51) Int. Cl.

| | | |
|---|---|---|
| G06Q 20/08 | (2012.01) | |
| G06Q 20/02 | (2012.01) | |
| G06Q 20/12 | (2012.01) | |
| G06F 3/0482 | (2013.01) | |
| G06Q 20/40 | (2012.01) | |
| H04L 67/30 | (2022.01) | |
| G06Q 20/38 | (2012.01) | |

(52) U.S. Cl.
CPC ......... *G06Q 20/027* (2013.01); *G06F 3/0482* (2013.01); *G06Q 20/12* (2013.01); *G06Q 20/385* (2013.01); *G06Q 20/40* (2013.01); *H04L 67/30* (2013.01)

(58) Field of Classification Search
USPC ...................................................... 705/35, 44
See application file for complete search history.

(56) References Cited

U.S. PATENT DOCUMENTS

| | | | | |
|---|---|---|---|---|
| 10,963,589 | B1* | 3/2021 | Fakhraie | .................. H04L 63/20 |
| 2020/0005258 | A1* | 1/2020 | Miller | .................. G06Q 20/102 |
| 2020/0065796 | A1* | 2/2020 | Jain | ....................... G06Q 20/405 |
| 2022/0207532 | A1* | 6/2022 | Daetz | ...................... H04L 69/08 |

* cited by examiner

*Primary Examiner* — William E Rankins
(74) *Attorney, Agent, or Firm* — Pramudji Law Group PLLC; Ari Pramudji

(57) ABSTRACT

Embodiments provide electronic methods and systems for performing recurring payments to the merchants. The method performed by an aggregator server includes receiving a standing instruction (SI) request including a plurality of unique data fields from an acquirer server. The unique data fields represent setting up of a recurring payment transaction from a payment instrument of a user to a merchant account of the merchant. The method includes generating and storing a unique identifier corresponding to the SI request. The method includes transmitting the SI request along with the unique identifier to an issuer server associated with the payment instrument to authorize the SI request for processing the recurring payment. The method further includes receiving an authorization response message in response to successful authorization of SI request by issuer server. Further, method includes transmitting authorization response message along with unique identifier to acquirer server for setup of SI for recurring payment.

10 Claims, 17 Drawing Sheets

REGISTRATION FORM

USER DETAILS — 422

- 424 — NAME: [ ]
- 426 — PHONE NUMBER: [ ]
- 428 — EMAIL: [ ]

PAYMENT TRANSACTION DETAILS — 430

- 432 — NUMBER OF RECURRING PAYMENTS: [ ▼ ]
- 434 — FREQUENCY OF RECURRING PAYMENT: [ ▼ ]
- 436 — PAYMENT AMOUNT: [ ]

PAYMENT CARD DETAILS — 438

SELECT PAYMENT CARD:
- 440 — ○ DEBIT CARD
- 442 — ○ CREDIT CARD
- 444 — ○ WALLET CARD
- 446 — PAYMENT CARD NUMBER: [ ]
- 448 — EXPIRY DATE: [ ]
- 450 — CVV: [ ]

452 — ☐ I HAVE READ AND AGREED TO THE TERMS AND CONDITIONS

454 — ( SUBMIT )

| UNIQUE DATA FIELD 502 | FIELD DESCRIPTION 504 | VALUES 506 |
|---|---|---|
| DE 22 sf1 | POINT OF SERVICE ENTRY MODE | 10 |
| DE 61 sf4 | POS CARDHOLDER PRESENCE/ STANDING ORDER | 4 |
| DE 112 SE 22 sf1 | NUMBER OF SI DEBITS | VALUE SELECTED AS MENTIONED BY USER AND TO BE PREPENDED WITH 0. EXAMPLE:- 04 OR 12 |
| DE 48 SE 41 sf1 | FREQUENCY OF SI | 01 – DAILY<br>02 – WEEKLY<br>03 – FORTNIGHTLY<br>04 – MONTHLY<br>05 – QUARTERLY<br>06 – HALF-YEARLY<br>07 – ANNUALLY<br>08 – AD HOC |
| DE 48 SE 40 sf1 | UNIQUE IDENTIFIER | A - DAILY<br>B – WEEKLY<br>C – FORTNIGHTLY<br>D – MONTHLY<br>E – QUARTERLY<br>F – HALF-YEARLY<br>G – ANNUALLY<br>H – AD HOC<br><br>EXAMPLE:- SID0000037 (SI -STATIC VALUE, D- FREQUENCY AND APPENDED BY SEQUENTIAL NUMBER) |

AGGREGATOR SERVER AND METHOD FOR GENERATING UNIQUE IDENTIFIERS FOR PROCESSING PAYMENTS FROM DIFFERENT PAYMENT INSTRUMENTS

TECHNICAL FIELD

The present disclosure relates to electronic methods and systems utilized in payment technology and, more particularly relates to, performing recurring payment transactions to merchants based on standing instructions across different types of payment networks by an aggregator server.

BACKGROUND

Customers purchase goods or avail services from merchants, and the customers make payments to the merchant for such purchases. Many times, the merchants offer options to the purchasers (i.e. customers) to make payment either at one instance (i.e., single payment) and/or through multiple payment transactions (i.e., recurring payment transaction) at periodic intervals. For instance, a customer may use a payment account to perform recurring payment transactions through digital payment channels (e.g., at the merchant site, or app) available with the merchants associated with utility bill payments, television subscriptions, internet service providers, etc. The customers generally perform payment transactions with the merchants on a periodic basis (e.g., monthly, weekly, yearly, etc.) by using their payment cards. If a customer fails to pay a merchant on a timely basis, the merchant may revoke the subscriptions and/or services to the customer, or in a worse scenario, the customer can be tagged as a defaulter.

Existing systems face issues in processing the recurring payment transactions associated with the customers on a timely basis and in an automatic manner. This is due to the fact that the bank, in which the customer is holding the payment account, may categorize the payment request received for the recurring payment transaction as a mail order or telephone order transactions. As a result, the bank may not identify the payment transaction initiated by the customer as a recurring payment transaction. Therefore, the bank associated with the customer may decline the payment transaction, considering the payment transaction to be a fraudulent transaction because of the absence of express authentication from the customer and/or cardholder (i.e., the customer) who is not present for performing the recurring payment transactions. Thus, the customer may have to do multiple payment transactions to the merchant till the end of the recurring payment transaction between the customer and the merchant. Such handling of the recurring transaction by the current payment systems leads to a cumbersome process for the customers as well as the merchants.

Presently, there are a few techniques in which the above drawbacks are addressed. Majority of such conventional systems of handling standing instruction transactions are managed by the issuing entities. The customers (e.g., cardholders or account holders) can directly register with an issuing entity (e.g., an issuing bank of a payment card) for setting up of the standing instructions. The issuing entity initiates the standing order at a set frequency and transfers the payment to the merchant account as per the periodicity. Alternatively, the issuing entity performs a one-time authentication while performing a payment of a small amount from the customer account to the merchant account, generates an identifier for future payments i.e. the standing instruction, and provides the identifier to the merchant. The merchant may need to include the identifier in the payment transaction message, which is further processed by the issuing entity. However, such inclusion of identifier in the payment transaction message is an additional overhead and adds to the complexity when the merchant has to deal with multiple issuing entities having issued numerous payment cards and multiple payment interchange networks involved in the transactions, and local jurisdictional rules applicable on the payment transactions with regard to the authentication requirements of the customers in the payment transactions. Further, the security of such standing instructions based transactions may have a risk of compromise when they have to be performed based on a mere presence of the identifier included within the payment transaction request.

Thus, there exists a need for techniques offered by an entity other than the issuers or acquirers, which obviates the complexity faced by the merchants, issuers and acquirers in handling standing instruction transactions, and the techniques should operate invariant of the types of merchants and issuers, and even payment interchange networks.

SUMMARY

Various embodiments of the present disclosure provide systems and methods for performing standing instructions based recurring transactions.

In an embodiment, a computer-implemented method is disclosed. The computer-implemented method, performed by an aggregator server, includes receiving a standing instruction request from an acquirer server associated with a merchant. The standing instruction request includes a plurality of unique data fields representing setting up of a recurring payment transaction from a payment instrument of a user to a merchant account of the merchant. The method includes generating and storing a unique identifier corresponding to the standing instruction request. The method includes transmitting the standing instruction request along with the unique identifier to an issuer server associated with the payment instrument to authorize the standing instruction request for processing the recurring payment. Further, the method includes receiving an authorization response message in response to successful authorization of the standing instruction request by the issuer server. The method further includes transmitting the authorization response message along with the unique identifier to the acquirer server representing completion of the setup of a standing instruction for the recurring payment transaction from the payment instrument to the merchant account.

In another embodiment, an aggregator server is disclosed. The aggregator server includes a communication interface, a memory including executable instructions, and a processor communicably coupled to the communication interface. The processor is configured to execute the executable instructions to cause the aggregator server to at least receive a standing instruction request from an acquirer server associated with a merchant. The standing instruction request includes a plurality of unique data fields representing setting up of a recurring payment transaction from a payment instrument of a user to a merchant account of the merchant. The aggregator server is further caused to generate and store a unique identifier corresponding to the standing instruction request. The aggregator server is further caused to transmit the standing instruction request along with the unique identifier to an issuer server associated with the payment instrument to authorize the standing instruction request for processing the recurring payment. The aggregator server is further caused to receive an authorization response message in response to successful authorization of the standing instruction request by the issuer server. The server system is further caused to transmit the authorization response message along with the unique identifier to the acquirer server for a setup of a standing instruction for the recurring payment transaction from the payment instrument of the user to the merchant account of the merchant.

In another embodiment, a computer-implemented method for performing standing instructions based recurring payment is disclosed. The method includes receiving, by an aggregator server associated with a payment network, a payment transaction request from an acquirer server associated with a merchant for performing a recurring payment transaction from a payment instrument of a user to a merchant account of the merchant. The method includes checking if the payment transaction request includes a plurality of unique data fields representing a recurring payment transaction based on a standing instruction. The method further includes checking the validity of plurality of unique data fields to determine if the payment transaction request is associated with the recurring payment transaction based on the standing instruction that is already setup. The method further includes determining the validity of the plurality of unique data fields based on corresponding values stored in a database linked with the aggregator server. Further, the method includes, upon successful validation, accessing the database linked with the aggregator server, to retrieve a unique identifier associated with the recurring payment transaction from the payment instrument to the merchant account. Furthermore, the method includes sending, by the aggregator server, the payment transaction request including the unique identifier to an issuer, wherein the issuer server processes the recurring payment transaction from the payment instrument to the merchant account without performing additional authentication of the user by matching the unique identifier received from the aggregator server with a stored unique identifier accessible with the issuer server.

BRIEF DESCRIPTION OF THE FIGURES

For a more complete understanding of example embodiments of the present technology, reference is now made to the following descriptions taken in connection with the accompanying drawings in which:

FIGS. 4A and 4B, collectively, represent example representation of user-interfaces (UI) displayed on a user device of the user for provisioning inputs related to the recurring payment, in accordance with an example embodiment;

FIG. 5 is an example representation of a table showing unique data fields associated with a SI request for processing the recurring payment, in accordance with an example embodiment of the present disclosure;

Figure 1:
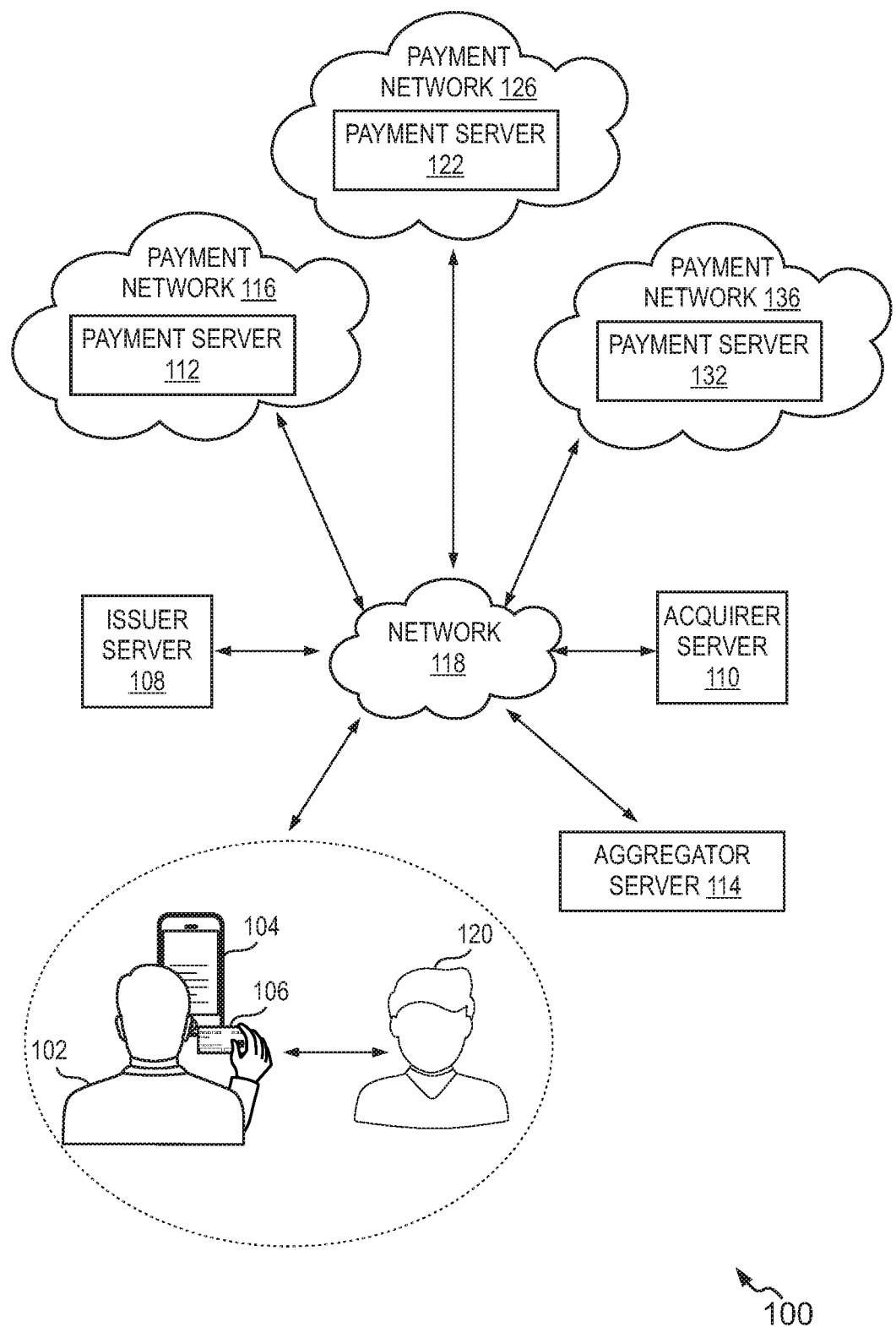
FIG. 1 is an example representation of an environment, related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "issuer", used throughout the description, refers to a financial institution normally called as an "issuer bank" or "issuing bank" in which an individual or an institution may have an account. The issuer also issues a payment card, such as a credit card or a debit card, etc. Further, the issuer may also facilitate online banking services such as electronic money transfer, bill payment, etc., to the account holders through a server system called as "issuer server" throughout the description. Further, the term "acquirer" represents an entity that transmits a purchase transaction to a payment card system for routing to the issuer of the payment card account in question. Typically, the acquirer has an agreement with merchants, wherein the acquirer receives authorization requests for purchase transactions from the merchants, and routes the authorization requests to the issuers of the payment cards being used for the purchase transactions. The terms "acquirer", "acquiring bank", "acquiring bank" or "acquirer bank" will be used interchangeably herein. Further, one or more server systems associated with the acquirer are referred to as "acquirer server" to carry out its functions.

The term "payment instrument" used throughout the description refers to a financial instrument that is used to fund the financial transaction (interchangeably referred to as "payment transaction"). Examples of the payment instrument include, but are not limited to a savings account, a credit account, an e-wallet account, a checking account and a virtual payment account. The payment instrument may be associated with an entity such as an individual person, a family, a commercial entity, a company, a corporation, a governmental entity, a non-profit organization and the like. In some scenarios, a payment instrument may be a virtual or temporary payment account that can be mapped or linked to a primary payment account, such as those accounts managed by payment wallet service providers. The terms "payment instrument" and "payment account" have been used interchangeably in the description.

The term "payment card", used throughout the description, refers to a physical or virtual card linked with a financial or payment account that may be used to fund a financial transaction to a merchant or any such facility via the associated payment account. Examples of the payment card include, but are not limited to, debit cards, credit cards, prepaid cards, virtual payment numbers, virtual card numbers, forex cards, charge cards, and stored-value cards. A payment card may be a physical card that may be presented to the merchant for funding the payment. Alternatively, or additionally, the payment card may be embodied in form of data stored in a user device, where the data is associated with payment account such that the data can be used to process the financial transaction between the payment account and a merchant's financial account.

The term "payment network", used throughout the description, refers to a network or collection of systems used for transfer of funds through use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc.

The term 'standing instruction', used herein refers to a banking instruction capable of facilitating an automatic repetitive payment of a fixed/variable amount to a loan, bill, credit card charge, subscription, or any other payment on a certain frequency (monthly, weekly, etc.).

Overview

Various example embodiments of the present disclosure provide methods, systems, user devices, and computer program products for performing standing instruction (SI) based payment transactions to the merchants. More specifically, various embodiments as disclosed herein enable merchants to provide an option to their customers to pay in installments i.e. recurring payments, without having a need to perform additional user authentication at each instance of the recurring payment transactions.

The present disclosure provides an aggregator server that enables setting up of standing instruction request (SI request) to facilitate the recurring payment transactions as per the SI that is already setup. The user may opt for the SI setup via the merchant or even the issuer associated with the payment account of the user, by visiting a POS terminal at the merchant location, by accessing a website or an online interface of the merchant, and the like. In at least one embodiment, before the SI request (or referred to as "SI setup request") is initiated for the user, the user may be asked to provide a one-time authentication of the payment account of the user using two-factor authentication, and the user may also need to provide his consent for generating the SI request. In the one-time authentication process, the user may be asked to pay a notional amount, for instance, 10 cents to the merchant account. The one-time authentication process can be completed in accordance with a typical payment transaction flow involving entities such as the merchant interface, acquirer, issuer, and the payment network.

Once the one-time authentication is performed and the consent of the user is received, the acquirer associated with the merchant account sends the SI request to the payment network. In various embodiments, the SI request includes a payment transaction request for making the first recurring payment transaction along with completing the SI set-up request. However, in some embodiments, the SI request can only be meant for setting up the SI, and the first recurring payment transaction can be performed at a later point in time.

The aggregator server is configured to receive the SI request from the acquirer associated with the merchant. The SI request is generated by the acquirer server by populating corresponding values in a plurality of unique data fields present in a typical payment transaction request message. In an embodiment, the SI setup request is a part of the payment transaction request generated for the first recurring payment by the merchant/acquirer. For instance, as per the message format of the payment transaction request, there are a few reserved bits that can be used to include the values of the unique data fields representing the SI setup request. Further, the aggregator server, on receipt of the payment transaction request from the acquirer, is configured to identify a payment transaction type associated with the SI request to be the recurring payment transaction based on the values present in the plurality of unique data fields in the SI request. Thereafter, the aggregator server is configured to generate and store a unique identifier corresponding to the SI request. For example, the unique identifier may be an alphanumeric value. The aggregator server transmits the SI request along with the unique identifier to the issuer associated with processing the recurring payment.

The issuer server may validate the plurality of unique data fields and process a first recurring payment transaction from the payment account of the user to the merchant account of the merchant. The issuer server also stores the unique identifier by linking it with the pair of the payment instrument and the merchant account. Further, the issuer server may provide an authorization response message along with the unique identifier to the acquirer server or the merchant via the aggregator server indicating completion of the setup of standing instruction for the recurring payment transaction from the payment instrument of the user to the merchant account of the merchant.

The merchant, having received with the approval from the user and the unique identifier stored after receipt of successful authorization by the issuer, may initiate the subsequent recurring payment transactions as per the SI. For instance, for subsequent recurring transactions (e.g., 2nd recurring payment), the acquirer of the merchant can initiate the SI transaction by including the plurality of unique data fields in the payment transaction request meant for the 2nd recurring payment. Once the aggregator server receives the payment transaction request containing values in the unique data fields, the aggregator server identifies the transaction as the SI transaction. Then, the aggregator server accesses the unique identifier stored for the pair of the merchant account and the payment account of the user. The aggregator server then transmits the payment transaction request (i.e. SI request) received from the acquirer by appending the unique identifier corresponding to the recurring payment transaction between the payment account and the merchant account. Thereafter, the issuer server processes the subsequent recurring payment transaction from the payment account of the user to the merchant account without any additional authentication performed for the user by matching the unique identifier received from the aggregator server with the stored unique identifier accessible to the issuer.

In some embodiments, the aggregator server may generate multiple unique identifiers for a pair of the merchant account and the payment account of the user. Each unique identifier can be associated with a certain transaction value. The multiple unique identifiers, generated by the aggregator server, are stored at the issuer server. The aggregator server appends the unique identifier for a certain transaction amount, if the same transaction amount is included in the payment transaction message of any of the subsequent recurring transactions. Once the issuer server receives the unique identifier for the certain transaction amount, the issuer server matches the received unique identifier with the available unique identifiers for the pair of merchant account and the payment account of the user. Based upon matching, the subsequent recurring transaction is processed.

In some embodiments, while setting up the recurring payment (SI), the unique data fields may have at least one data field that represents a variation in the payment amount. For instance, if a certain data field in the payment transaction request is set, it can be understood that the transaction amount entered in the payment request is different than the already set transaction amount, and such variation is intentional. Presence of such a data field may also represent a certain percentage of the already set transaction amount, which should be paid to the merchant account in the current recurring transaction.

In some embodiments, the aggregator server acts as a centralized SI processing hub, and is communicably linked to a plurality of payment networks such as payment network-1, payment network-2, to payment network-n. As the aggregator server receives the SI payment transaction request, the aggregator server determines the appropriate payment network, and retrieves the unique identifier, appends the unique identifier to the payment transaction request and provides the request to the appropriate payment network for processing the SI payment transaction request. Alternatively, the aggregator server receives the SI payment transaction request from respective payment network, and appends the unique identifier to the payment transaction request and provides the request to the appropriate payment network or directly to the issuer. In at least one embodiment, the aggregator server can be closely linked with one payment network, while being connected to other payment networks. For instance, the aggregator server can be an SI processing hub even being as a part of the payment network-1; the aggregator server can also be liked with payment network-2, . . . payment network-n.

In some embodiments, the user may provide input by accessing the application associated with the merchant to terminate the recurring payment transaction from the payment account of the user to the merchant account. Thus, the aggregator server may route an SI cancellation request appended with the unique identifier received from the acquirer server to the issuer server. The issuer server may be configured to identify the unique identifier stored in a database linked with the issuer server and to block the unique identifier which confirms the cancellation of the recurring payment transaction from the payment account to the payment account.

Various embodiments of the present disclosure offer multiple advantages and technical effects. For instance, the present disclosure enables users/customers to perform recurring payments to pay the merchants in a very convenient manner. The recurring payment provides flexibility and greater convenience to the customers to pay the merchants via recurring payments without any need of performing additional user authentication each time of the recurring payments. For example, the user is authenticated once while registering and/or opting to pay the merchant through recurring payments on a periodic basis. Thereafter, the subsequent recurring payments are automated which precludes the authentication of the user such that the merchants may perform subsequent recurring payments based on the presence of the unique data fields in the payment transaction request and matching of the unique identifier by the issuer. Further, the present disclosure provides a dedicated aggregator server that can be considered as the SI hub that can process the recurring transactions across payment networks. For instance, the SI hub can be linked with various payment networks, and the payment servers can communicate with the SI hub for processing the recurring payments. Since, the aggregator server is a server different from the acquirer server and the issuer server, and operates within or is closely linked with the payment network, merchants are able to easily process the SI transactions irrespective of the types of issuing banks and the acquiring banks, and even the payment network. A centralized enablement of the aggregator server helps in providing a standardized process of setting up of SI transactions and processing thereof. Any changes in the local jurisdictional regulations affecting the SI transaction can be updated at a single place i.e. the SI hub. Further, the issuing banks are not required to generate unique identifiers, and the merchants are not required to add any unique identifier in the initial transaction request. Rather, the merchants, via the acquirer servers, can indicate the SI transactions by setting up certain reserved bits in the transactions message, which upon receipt by the aggregator server, is recognized as the SI transaction. Further, since each recurring transaction is performed based on checking the presence of the unique data fields in the transaction request and the matching of the unique identifier provided by the aggregator server and the one stored at the issuer server, the instances of chargeback requests at the issuer server will be minimized to a great extent. Various embodiments of processing the SI transactions are described in the present disclosure with reference to FIGS. 1 to 12.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, automating subsequent recurring payments subsequent to processing of a first recurring payment. The environment 100 generally includes a user 102 (hereinafter interchangeably referred to as "customer 102") associated with a user device 104 (e.g., a mobile phone), an issuer server 108, an acquirer server 110, payment servers 112, 122 and 132, an aggregator server 114, and a network 118. In one embodiment, the payment server 112 is associated with a payment network 116 (e.g., a first payment network), the payment server 122 is associated with a payment network 126 (e.g., a second payment network) and the payment server 132 is associated with a payment network 136 (e.g., a third payment network). Only one example of issuer and acquirer is shown for simplicity, and there can be multiple such issuers and acquirers.

Various entities in the environment 100 may connect to the network 118 in accordance with various wired and/or wireless communication protocols, such as, Transmission Control Protocol and Internet Protocol (TCP/IP), User Datagram Protocol (UDP), $2^{nd}$ Generation (2G), $3^{rd}$ Generation (3G), $4^{th}$ Generation (4G), $5^{th}$ Generation (5G) communication protocols, Long Term Evolution (LTE) communication protocols, or any combination thereof. The network 118 may include, without limitation, a local area network (LAN), a wide area network (WAN) (e.g., the Internet), a mobile network, a virtual network, and/or another suitable public and/or private network capable of supporting communication among two or more of the entities illustrated in FIG. 1, or any combination thereof. For example, the network 118 may include multiple different networks, such as a private network made accessible by the payment networks 116, 126 and 136 to the issuer server 108 and the acquirer server 110 and separately, a public network (e.g., the Internet) through which the issuer server 108, the acquirer server 110, and the payment servers 112, 122 and 132 may communicate to each other.

The environment 100 including the aggregator server 114 is configured to perform one or more of the operations described herein. In general, the aggregator server 114 is configured to generate a unique identifier corresponding to a standing instruction (SI) request. In the illustrated embodiment, the aggregator server 114 is a standalone component in the environment 100, and is distinct from the payment servers 112, 122 and 132. However, the aggregator server 114 may also be closely linked with any of the payment servers 112, 122 and 132. In addition, the aggregator server 114 should be understood to be embodied in at least one computing device in communication with the network 118, which may be specifically configured, via executable instructions, to perform as described herein, and/or embodied in at least one non-transitory computer readable media.

In one embodiment, the acquirer server 110 is associated with a financial institution (e.g., a bank) that processes financial transactions. This can be an institution that facilitates the processing of payment transactions for physical stores, merchants, or an institution that owns platforms that make online purchases or purchases made via software applications possible (e.g., shopping cart platform providers and in-app payment processing providers).

In the illustrative embodiment, the user 102 may be a cardholder (e.g., as shown in FIG. 1). More specifically, the user 102 may be any individual buyer and/or customer, or any other person that is presenting credit or debit card during a payment transaction to a merchant representative or other seller or via an online interface associated with the merchant. The customer 102 may have a payment instrument (e.g., a payment card 106) issued by an issuing bank (associated with the issuer server 108) and may be provided with the payment card 106 with financial or other account information encoded onto the payment card 106. As such, the customer 102 may use the payment card 106 to initiate and complete a payment transaction using the payment account of the user 102 at the issuing bank.

In one embodiment, the issuer server 108 is associated with a financial institution normally called as an "issuer bank" or "issuing bank" or simply "issuer", in which the user 102 may have a payment account, (which also issues a payment card, such as a credit card or a debit card), and which provides microfinance banking services (e.g., payment transaction using credit/debit cards) for processing electronic payment transactions, to the customer 102.

In the illustrated representation, the payment servers 112, 122, 132 associated with the payment networks 116, 126, 136 are shown. The payment networks 116, 126, 136 may be used by the payment cards issuing authorities as a payment interchange network. Examples of payment interchange network include, but not limited to, Mastercard® payment system interchange network. The Mastercard® payment system interchange network is a proprietary communications standard promulgated by Mastercard International Incorporated® for the exchange of financial transaction data among financial institutions that are members of Mastercard International Incorporated®. (Mastercard is a registered trademark of Mastercard International Incorporated located in Purchase, N.Y.).

In one example, the user 102 purchases goods or services from a merchant 120 using the payment card 106 by opting recurring payment transaction type to pay the merchant 120. In this example scenario, the user 102 associated with the user device 104 (e.g., a mobile phone) may access the merchant site and/or application, or a payment facilitator page associated with the merchant 120 on the user device 104 for registering to perform the recurring payment with the merchant 120. The user 102 may enter corresponding details related to the recurring payment such as, but not limited to, payment card details presented on the payment card 106, information related to the recurring payments (such as number of debits which determine time period of recurring payments, and recurring payment frequency) for registering to perform the recurring payment to the merchant 120 etc. More particularly, the user 102 may have to go through this one-time registration process with the merchant 120 for performing the recurring payment.

Further, the user 102 is requested to provide a consent and/or permission to the merchant 120 for performing the recurring payments through a second factor authentication. Upon successful second factor authentication, the standing instruction request may be generated by the acquirer server 110 by populating a plurality of unique data fields based on the user inputs provided while registering. In general, the second factor authentication may be an approval provided by the user 102 to the merchant 120 to perform recurring payment on a periodic basis as mentioned while registering for the recurring payment by the user 102. In an embodiment, the SI request (i.e. SI setup request) is generated and the first recurring payment is also performed simultaneously. However, the SI requested can be generated and the first recurring payment can also be performed at a later point of time.

In one embodiment, the aggregator server 114 is configured to perform one or more of the operations described herein. The aggregator server 114 is configured to create and assign the unique identifier corresponding to the SI request and route the SI request to the issuer server 108 for processing the recurring payment (i.e. the first recurring payment). Thus, the issuer server 108 may perform the first recurring payment by approving the SI request for the recurring payment. As such, the issuer server 108 approves the first recurring payment, and stores the unique identifier by linking it with the pair of the payment account of the user 102 and the merchant account of the merchant 120. Accordingly, for any subsequent recurring transaction, if the unique identifier is included in the payment request received from the aggregator server 114, the issuer server 108 identifies that the incoming transaction request is a recurring transaction as per the already setup SI between the user 102 and the merchant 120. Such recurring transactions do not need any further authentication checks required from the user 102, and these transactions are considered as already authorized based on the presence of the unique identifier. Hence, the aggregator server 114 is configured to validate the SI request for each subsequent recurring payment received from the acquirer server 110 and append the unique identifier to the SI request for processing of each subsequent recurring payment.

The aggregator server 114 is configured to service SI setup request and processing subsequent recurring payment transactions for the payment instruments (e.g., payment card, or digital payment account) for all of the payment networks 116, 126 and 136. The payment networks 116, 126 and 136 can be distinct payment interchange networks, and the payment servers 112, 122 and 132 can be example of different payment processing servers. It is noted that the aggregator server 114, stores the unique identifiers for the merchant account and the payment instrument of the customer and corresponding payment network. The aggregator server 114 may store the unique identifiers for different payment networks in separate databases. For example, the aggregator server 114, upon receipt of the SI setup requests for the payment instrument linked with the payment network 126, the aggregator server 114 generates the unique identifier and sends the generated unique identifier to the payment server 122. Similarly, the aggregator server 114, upon receipt of the SI setup request for the payment instrument linked with the payment network 136, the aggregator server 114 generates the unique identifier and sends the generated unique identifier to the payment server 132. For instance, the aggregator server 114, upon receipt of a payment transaction request, determines the transaction as an SI transaction and also determines the intended payment network for the current payment transaction request. If the aggregator server 114 determines that the payment network 126 should be used for the payment transaction, the aggregator server 114 provides the payment transaction request appended with the unique identifier to the payment network 126 for further processing.

The number and arrangement of systems, devices, and/or networks shown in FIG. 1 are provided as an example. There may be additional systems, devices, and/or networks; fewer systems, devices, and/or networks; different systems, devices, and/or networks, and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100.

Figure 2A:
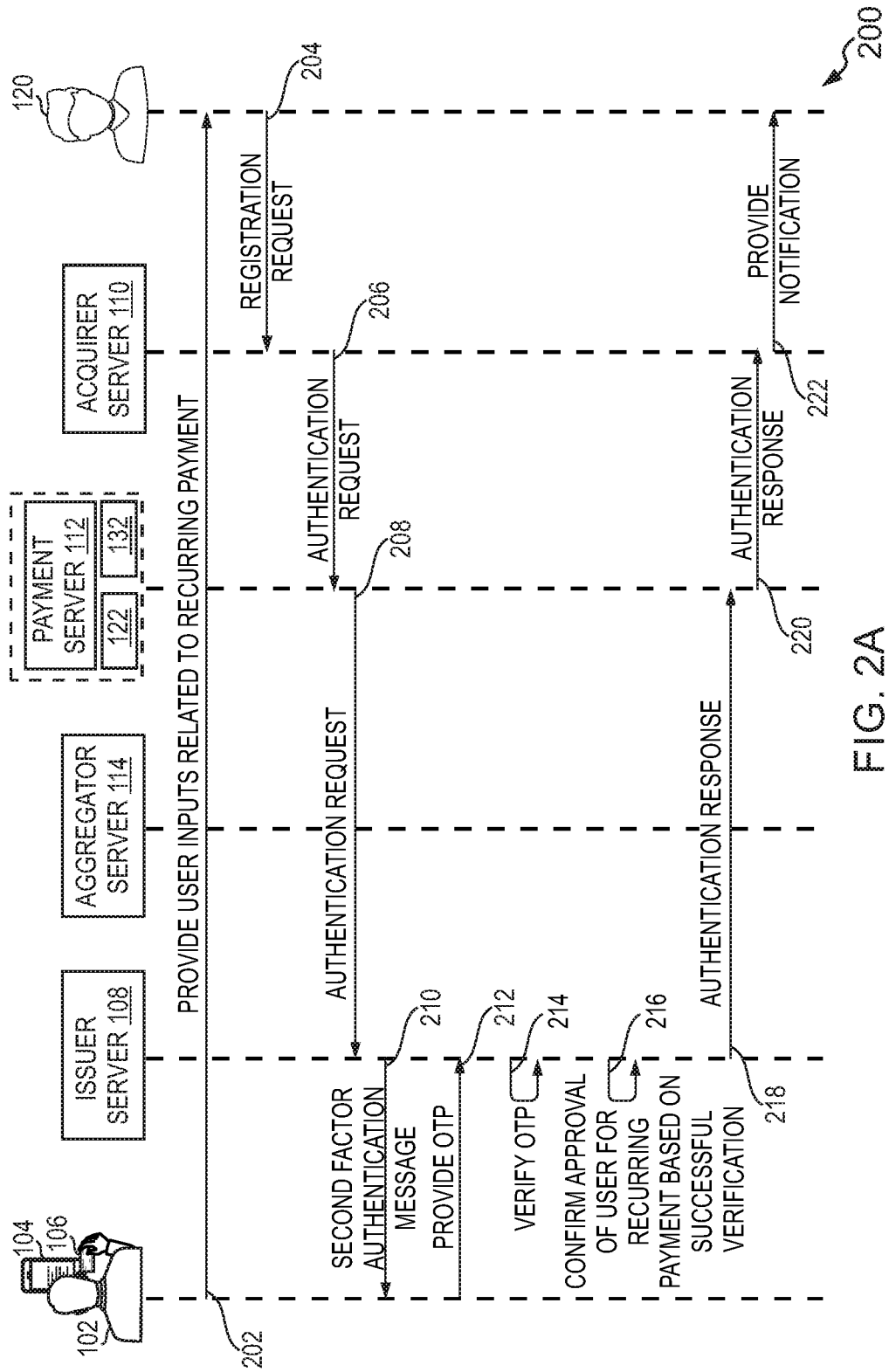
FIGS. 2A, 2B and 2C, collectively, represent a sequence flow diagram for setting up a standing instruction (SI) for recurring payment from a payment account of a user to a merchant account of a merchant, in accordance with an example embodiment of the present disclosure.
Figure 2B:
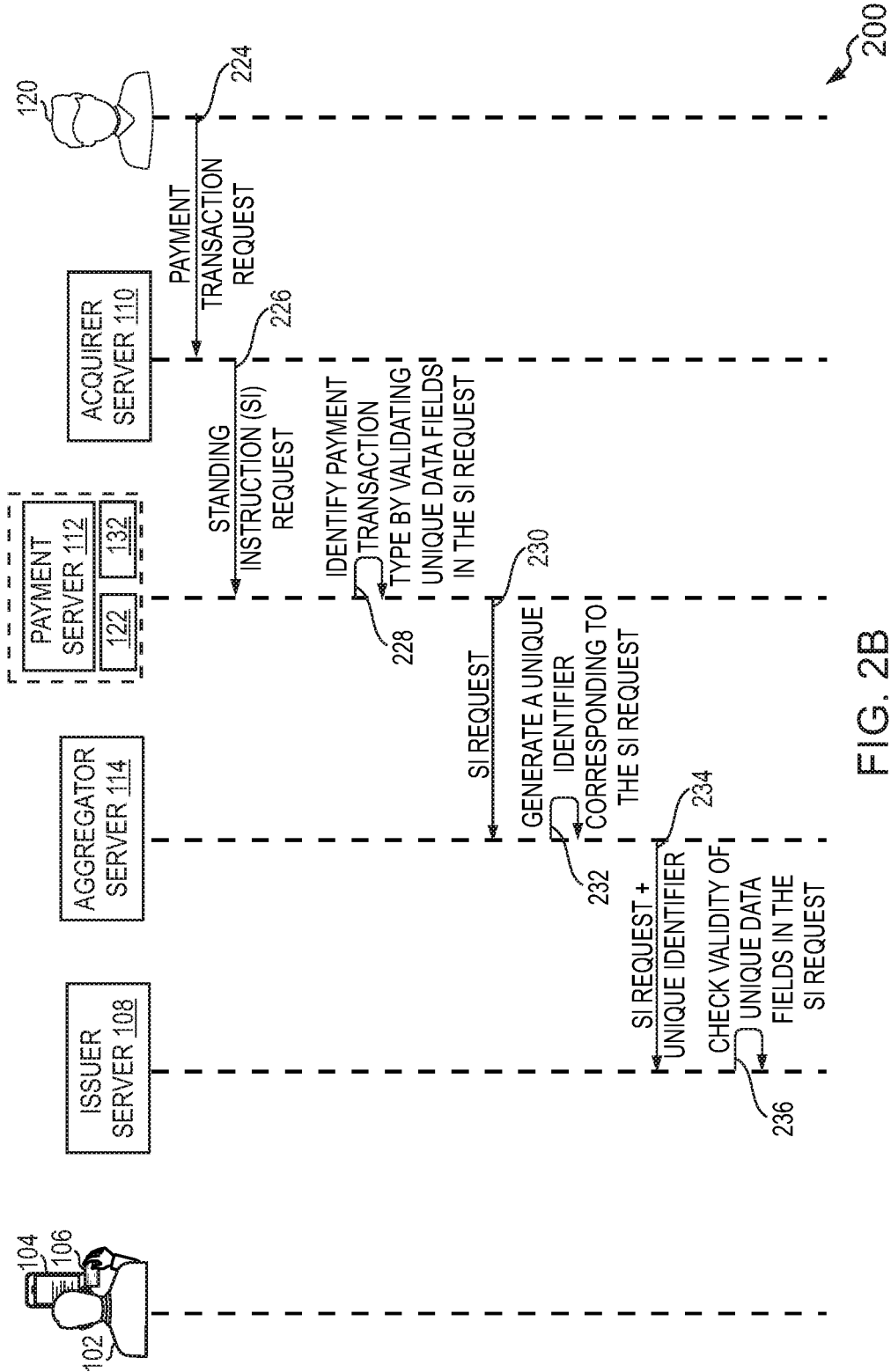
Figure 2C:
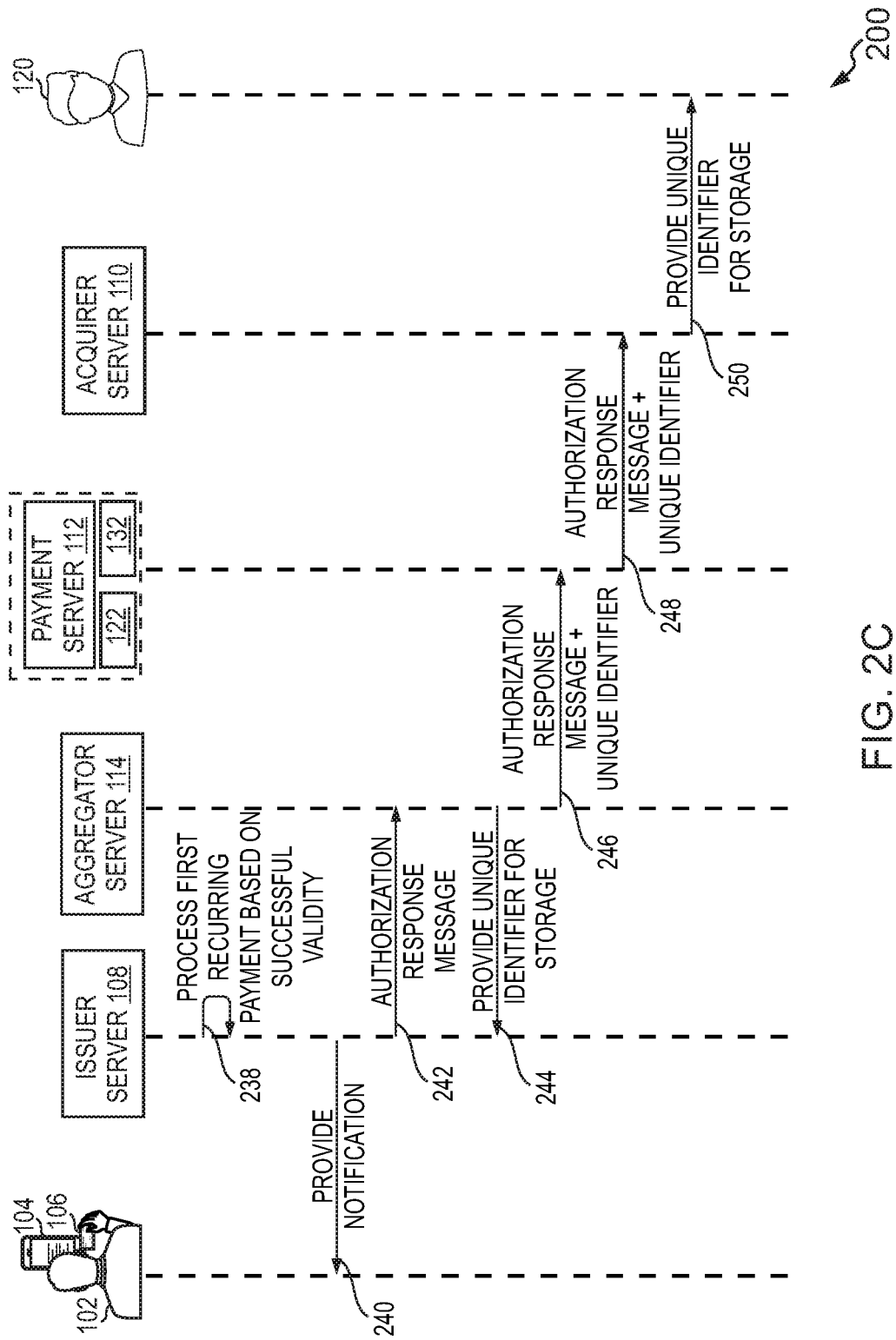

FIGS. 2A, 2B and 2C, collectively, represent a sequence flow diagram 200 for setting up a standing instruction for recurring payment from the payment account of the user 102 to the merchant account associated with the merchant 120, in accordance with an example embodiment of the present disclosure. The sequence of operations of the sequence flow diagram 200 may not be necessarily executed in the same order as they are presented. Further, one or more operations may be grouped together and performed in form of a single step, or one operation may have several sub-steps that may be performed in parallel or in sequential manner. The sequence flow diagram 200 is described by taking reference of the payment server 112, as it is assumed that the payment instrument (e.g., a first payment instrument) of the user 102 belongs to the payment server 112, for example, the issuer server 108 may have tied up with the payment network 126 while issuing the payment instrument. Similarly, operations described in the flow diagram 200 are equally applicable for a second payment instrument belonging to the second payment network i.e. the payment network 126. Further, the operations described in the flow diagram 200 are equally applicable for a third payment instrument belonging to the third payment network i.e. the payment network 166. Hence, it should be understood that all of the process steps of the flow diagram 300 can be performed for the payment servers 122 and 132, if the payment instrument belongs to any of the payment servers 122 and 132, and the aggregator server 114 can perform such processes in parallel manner with multiple payment networks 116, 126 and 136.

At 202, the user 102 provides inputs related to the recurring payment based on opting for a recurring payment transaction type (i.e., standing instruction facility) to pay the merchant 120. The user 102 may access the merchant website, application, or the in-app payment service providers associated with the merchant 120 for providing the user inputs to the merchant 120. The user 102 enters corresponding details in a user interface rendered on the user device 104 such as, but not limited to, payment card details presented on the payment card 106 of the user 102 (such as payment card number, card verification value (CVV), expiry date etc.), number of recurring payments to be performed which determines the time period of recurring payment s (i.e., start date and end date of recurring payment), and recurring payment frequency (i.e., occurrence of each subsequent recurring payment subsequent to the first recurring payment).

At 204, the merchant 120 provides a registration request to the acquirer server 110 based upon receiving the user inputs from the user 102. The registration request may include the user inputs provided for registering to utilize the SI transaction facility.

At 206, the acquirer server 110 transmits and/or sends an authentication request along with the registration request details to the payment server 112.

At 208, the payment server 112 transmits the authentication request to the issuer server 108. More specifically, the payment server 112 may be configured to identify the issuer server 108 associated with the payment account of the user 102 based on the card details provided in the authentication request. Upon identifying the issuer server 108, the payment server 112 transmits the authentication request to the issuer server 108 for seeking permission or consent from the user 102 for performing the recurring payment to the merchant 120. In one embodiment, the operations 206 and 208 may be performed in a single step, where the acquirer server 110 transmits the authentication request along with the registration details to the issuer server 108 via the payment server 112.

At 210, the issuer server 108 transmits a second factor authentication message to the user device 104 of the user 102. Upon receiving the authentication request, the issuer server 108, utilizes a database for retrieving information associated with the user 102 and identifies the payment account associated with the user 102. Thereafter, the issuer server 108 transmits the second factor authentication message to the user device 104 of the user 102 over a messaging medium, such as Short Message Service (SMS) medium or a chat medium to the user 102. In a non-limiting example, the second factor authentication message may include a one-time password (OTP).

At 212, the user 102 is prompted to enter the OTP provided in the second factor authentication message at the UI rendered on the user device 104 and the user 102 sends the OTP entered to the issuer server 108 for verification. The OTP or other authentication information can be entered using a touch input, voice input, or through another means that can be interpreted and sent to the issuer server 108 in a format understandable by the issuer server 108.

At 214, the issuer server 108 verifies the OTP entered by the user 102 to authenticate the user 102 and the payment account of the user 102. At 216, the issuer server 108 confirms the approval of the user 102 for performing the recurring payments on the periodic basis by the merchant 120 from the payment account of the user 102 to the merchant account of the merchant 120 based on successful verification of the user 102. In other words, the user 102 is registered with the merchant 120 to utilize the recurring payment based on successful verification of the OTP entered by the user 102 (i.e., successful second factor authentication). In some embodiments, the authentication of the user 102 for utilizing the recurring payment may involve seeking user permission for processing subsequent recurring payments. Accordingly, subsequent recurring payments may be automatically processed without any authentication of the user 102 and the payment account of the user 102 may directly be debited as per the user input related to the SI while registering.

In one embodiment, when the OTP entered by the user 102 is incorrect, the issuer server 108 may send the second factor authentication message with a new OTP to the user device 104 and request the user 102 to re-enter the OTP using a corresponding UI.

At 218, the issuer server 108 transmits an authentication response to the payment server 112 upon successful verification of the user 102 through the second factor authentication. In one embodiment, upon successful verification of the user 102 through the second factor authentication, the issuer server 108 may notify the user 102 about successful registration of the user 102 for utilizing the recurring payment.

At 220, the payment server 112 transmits the authentication response received from the issuer server 108 to the acquirer server 110. Further, the authentication response indicative of confirmation of the user 102, through the second factor authentication for performing recurring payment with the merchant 120, may be stored in a database associated with the payment server 112.

At 222, the acquirer server 110 provides a notification to the merchant 120 about the approval and/or consent of the user 102 through the second factor authentication for performing the recurring payment on the periodic basis. As such, the notification provided to the merchant 120 confirms the completion of registration process of the user 102 with the merchant 120 for performing the recurring payment. In this scenario, the merchant 120 is associated with the payment card details, information related to the recurring payment and the approval of the user 102 for performing the recurring payment by the merchant 120 with the user 102 on the periodic basis.

In the illustrative embodiment, the registration of the user 102 for utilizing the recurring payment type and providing the approval to the merchant 120 for performing the recurring payments on the periodic basis (i.e., operations 202-222) is a one-time process. Further, the operations 224 to 250 are used to carry out the first recurring transaction in which SI request (i.e. SI setup request) is also included.

At 224, the merchant 120 transmits a payment transaction request to perform the recurring payment with the user 102. For example, the payment transaction request may include payment amount, the user inputs provided while registering for the SI, information of the merchant payment account, among other things. The merchant 120 triggers the payment transaction by routing the payment transaction request to the acquirer server 110 based upon completion of the one-time processed operations 202-222 based on the receipt of successful authorization from the issuer server 108, the permission of the user 102, and the user inputs provided by the user 102 while registering for the recurring payment.

At 226, the acquirer server 110 transmits the SI request (also referred to as 'SI setup request' included in the first recurring transaction request) to the payment server 112. The acquirer server 110 includes the SI request in the first recurring transaction request by entering corresponding values in the plurality of unique data fields associated with the SI request. In general, the SI request is generated by the acquirer server 110 by populating the unique data fields corresponding to the recurring payment from the payment account of the user 102 to the merchant account of the merchant 120. In an embodiment, the unique data fields include at least one bit that can represent if there is any variation in the payment amount of the recurring payment.

In an example, the unique data fields for the SI request may be populated with corresponding values such as a value representing that the SI request is the recurring payment request, a value representing that the payment transaction is a card not present SI transaction, a value representing the number of debits, and a value representing the recurring payment frequency. In some examples, the values to be populated in the unique data fields may be predefined by at least the payment server 112 or the aggregator server 114 for utilizing by the acquirer server 110 and the issuer server 108 to process the recurring payment. Some illustrative examples of the values associated with the plurality of unique data fields are explained with reference to FIG. 5.

At 228, the payment server 112 identifies the payment transaction type to be the recurring payment transaction type or a SI transaction type based on the values assigned to the unique data fields of the SI request. More specifically, the payment server 112 with access to the database, may compare the values associated with the plurality of unique data fields with the corresponding values stored in the database to identify the payment transaction associated with the SI request to be the recurring payment transaction based on the comparison. Upon identifying the payment transaction type, the payment server 112 transmits the SI request to the aggregator server 114 (see, 230 of FIG. 2).

At 232, the aggregator server 114 is configured to generate and/or create the unique identifier corresponding to the SI request. Further, the aggregator server 114 stores the unique identifier which may be used to process subsequent recurring payments. In a non-limiting example, the unique identifier may be an alphanumeric value and is indicative of the relationship associated with the recurring payment between the user 102 and the merchant 120. In one form, the unique identifier may be generated by a random number generator. In some other forms, the unique identifier can be generated from using a combination of the merchant account and the payment account. In some other embodiments, the aggregator server 114 is configured to generate a plurality of unique identifiers for a pair of the merchant account and the payment account of the user 102. Each of these unique identifiers can be associated with a certain transaction amounts. For instance, if the merchant has set up an SI of either of variable amounts $125, $250, and $500, the unique identifiers can be generated for each of these amounts by the aggregator server 114.

At 234, the aggregator server 114 transmits the SI request along with the unique identifier to the issuer server 108. More specifically, the aggregator server 114 appends the unique identifier in a unique data field of the plurality of unique data fields of the SI request and transmits to the issuer server 108 for processing the recurring payment. It is understood that, the SI request may include the user inputs provided in the registration request which are utilized by the aggregator server 114 to identify the issuer server 108 associated with the user 102.

At 236, the issuer server 108 checks the validity of the unique data fields in the SI request (i.e. it is checked whether valid values are present in the unique data fields). In an illustrative manner, the issuer server 108 may be provided with the corresponding values associated with the unique data fields as described above which may be used by the issuer server 108 to check the validity of the unique data fields in the SI request. Upon checking the validity of the unique data fields, the issuer server 108 may determine that the SI request corresponds to the recurring payment from the payment account of the user 102 to the merchant account of the merchant 120.

At 238, the issuer server 108 performs the first recurring payment based at least on the validity of the unique data fields. In other words, the issuer server 108 approves and/or authorizes the SI request for performing the recurring payment from the payment account of user 102 to the merchant account of the merchant 120 without any additional authentication process such as second factor authentication. In addition, the issuer server 108 may check the availability of sufficient balance in the payment account of user 102. Thereafter, the issuer server 108 debits a payment amount as per the input related to the SI (or as per the amount specified in the SI request) from the payment account of the user 102. At 240, the issuer server 108 provides a notification indicative of the successful payment transaction status to the user device 104 of the user 102.

In one embodiment, the payment amount may vary in the subsequent recurring payments to the merchant 120. For instance, the merchant 120 may track the usage of services/subscriptions by the user 102 for charging additional amount which will be added to the payment amount of the next recurring payment. The processing of subsequent recurring payments is explained in detail with reference to FIG. 3.

At 242, the issuer server 108 sends an authorization response message to the aggregator server 114 based on approving and/or authorizing the SI request for the recurring payment and processing of the first recurring payment.

At 244, the aggregator server 114 further transmits the unique identifier to the issuer server 108 for storage. Thus, the issuer server 108 may utilize the unique identifier to approve the SI request for subsequent recurring payments between the user 102 and the merchant 120 without any need of the additional authentication from the user 102.

In addition, the aggregator server 114 creates a note of approval of the issuer server 108 for the recurring payment based on already setup SI between the user 102 and the merchant 120. Thus, the aggregator server 114 establishes a relationship between the user 102 and the merchant 120 based on the unique identifier assigned to the SI request, and provides the unique identifier to each of the issuer server 108 and the acquirer server 110 for storage at their ends.

For example, at 246, the aggregator server 114 routes the authorization response message along with the unique identifier to the payment server 112. Further, at 248, the payment server 112 routes the authorization response message along with the unique identifier to the acquirer server 110. Based on receipt of the authorization response message, the acquirer server 110 sets up the standing instruction for the recurring payment from the payment account of the user 102 to the merchant account of the merchant 120.

In an embodiment, at 250, the acquirer server 110 further transmits the unique identifier to the merchant 120 for storage. The merchant 120 may store the unique identifier as a reference or receipt of successful registration of the user 102 and thereby invokes subsequent recurring payments on the periodic basis using the unique identifier and the plurality of unique data fields, as described further with reference to FIGS. 3A and 3B.

Figure 3A:
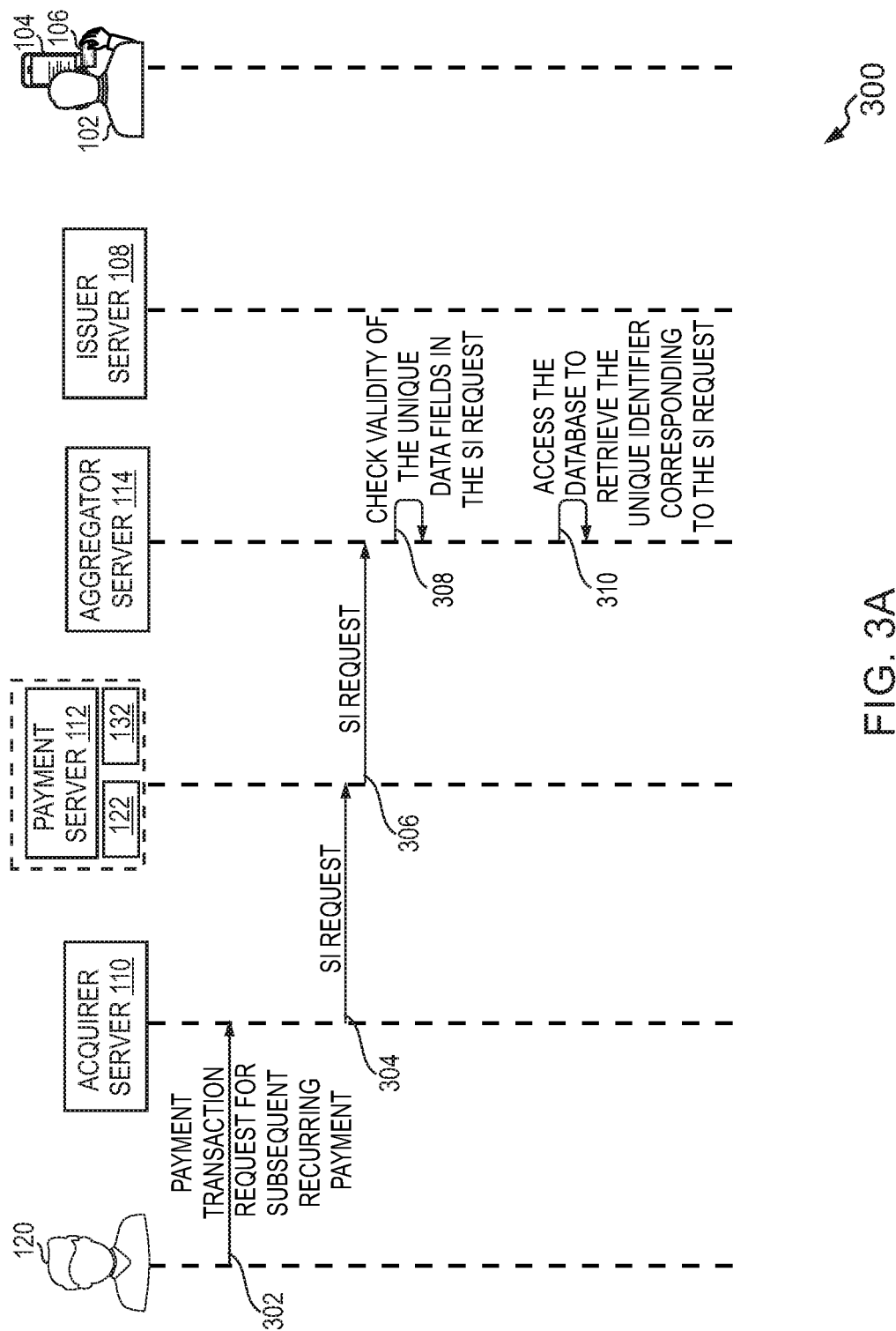
FIGS. 3A and 3B, collectively, represent a sequential flow diagram for performing subsequent recurring payments to the merchant, in accordance with an example embodiment of the present disclosure.
Figure 3B:
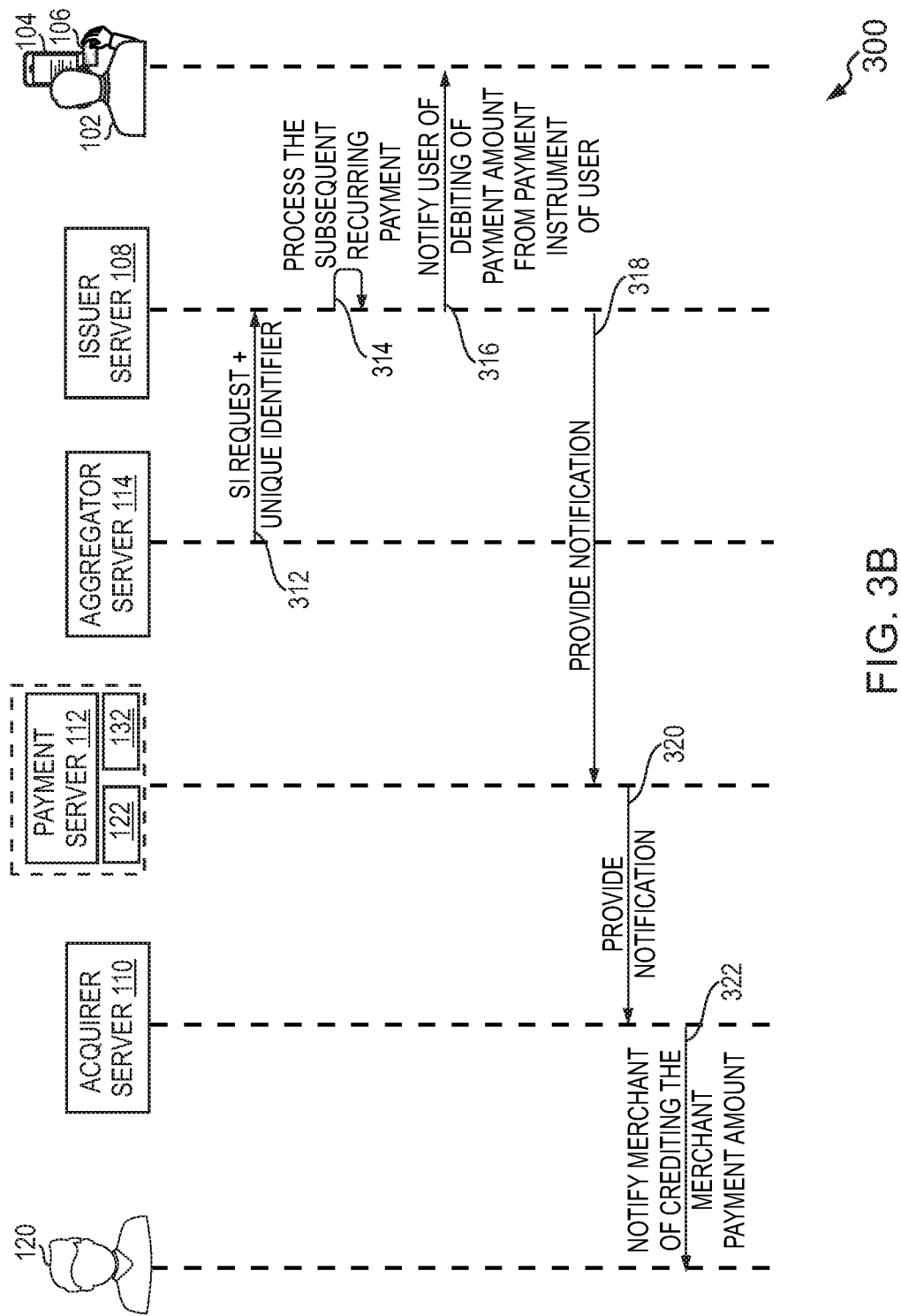

FIGS. 3A and 3B, collectively, represent a sequential flow diagram 300 for performing subsequent recurring payments from the payment account of the user 102 to the merchant account of the merchant 120, in accordance with an example embodiment of the present disclosure. The flow diagram 300 is described by taking reference of the payment server 112, as it is assumed that the payment instrument of the user 102 belongs to the payment server 112, for example, the issuer server 108 may have been tied up with the payment network 116 while issuing the payment instrument. However, it should be understood that all of the process steps of the flow diagram 300 can be performed for the payment servers 122 and 132, if the payment instrument belongs to any of the payment servers 122 and 132. The process starts at 302.

At 302, the merchant 120 transmits a payment transaction request to the acquirer server 110 for triggering the subsequent recurring payment among the set of recurring payments from the payment account of the user 102 to the merchant account of the merchant 120. In one form, the merchant 120 may invoke the subsequent recurring payment as per the already received approval from the user 102 through the second factor authentication and setup of the SI between the payment account and the merchant account. In another form, invoking of subsequent payment may be provided by the user 102 while registration (i.e., onset of the date of the scheduled next payment from among the set of recurring payments). In one form, the user 102 may mention a date in the registration request for invoking the subsequent recurring payments. In another form, the date may be predefined based on selection of the recurring payment frequency by the user 102.

In some forms, the payment transaction request from the merchant 120 may also include the purchase transaction amount associated with the respective recurring payment. In one example scenario, the recurring payment may involve minor variation in the payment amount, for example, in case of missed daily purchase or increased consumption in a particular period. In such a scenario, the inclusion of the purchase amount in the payment transaction request provides the flexibility to charge the user 102.

At 304, the acquirer server 110 routes the SI request for subsequent recurring payment by populating the unique data fields with the corresponding values based on receipt of the payment transaction request from the merchant 120. More specifically, the acquirer server 110 generates the SI request for the subsequent recurring payment based upon matching the unique identifier in the payment transaction request to the unique identifier stored in the database of the acquirer server 110. Thereafter, the unique data fields of the SI request are populated with the corresponding values and transmitted to the payment server 112 for processing the subsequent recurring payment transaction.

At 306, the payment server 112 routes the SI request corresponding to the subsequent recurring payment to the aggregator server 114 (i.e. SI hub). At 308, the aggregator server 114 validates the unique data fields associated with the SI request. In other words, the aggregator server 114 is configured to validate the SI request including the unique data fields to identify the SI request initiated for the subsequent recurring payment from the payment account of the user 102 to the merchant account of the merchant 120.

At 310, the aggregator server 114 is configured to access the database linked to the aggregator server 114 to retrieve the unique identifier associated with the SI request while setting up for the recurring payment. The aggregator server 114, by accessing the database, identifies the unique identifier which is stored after the receipt of approval from the issuer server 108 subsequent to processing of the SI setup and the first payment of the SI.

At 312, the aggregator server 114 sends the SI request (i.e. the payment transaction request) along with the unique identifier associated with the issuer server 108 for processing the subsequent recurring payment. It is noted that the aggregator server 114 may identify the issuer server 108 associated with the user 102 based on the details included in the SI request.

At 314, the issuer server 108 processes the subsequent recurring payment based upon validating the SI request received from the aggregator server 114. More specifically, the issuer server 108 may be configured to match the unique identifier associated with the SI request with the stored unique identifier to determine that the payment request corresponds to the recurring payment between the user 102 and the merchant 120. As noted, the issuer server 108 already has the stored unique identifier for the pair of payment account of the user 102 and the merchant account of the merchant 120. Upon identifying the SI request (i.e. based on successful match), the issuer server 108 processes the payment transaction as the recurring payment without additional authentication. It is noted that the authentication of the user 102 is not performed again (based on the successful authentication during the first recurring payment) as per the terms and conditions approved by the user 102 before setting up of the SI and the first recurring payment transaction.

At 316, the issuer server 108 provides a notification of the successful processing of the recurring payment (i.e., the next payment subsequent to the first payment) to the user 102. Herein, processing means authorization of debiting of the payment amount from the payment account of the user 102 to the merchant account of the merchant 120, which may be the instant debit or a debit at a later point of time as per the clearing and settlement process of payment transactions. In an example, the step 316 may be optional, and it can be performed after or along with the step 322, as described below.

At 318, the issuer server 108 notifies the payment server 112 about the successful processing of the recurring payment. The payment server 112 may be configured to record the successful processing of the subsequent recurring payment. Further, the payment server 112 may be configured to notify the acquirer server 110 about the successful processing of the recurring payment (see, 320 of FIG. 3).

At 322, the acquirer server 110 may also notify the merchant 120 about the successful processing of the recurring payment and crediting of the payment amount to the merchant account of the merchant 120 from the payment account of the user 102. It is noted that the sequence flow steps from 302 to 322 may be repeated for each recurring payment from among the set of recurring payments till the end date of the recurring payment as selected by the user 102.

Figure 4A:
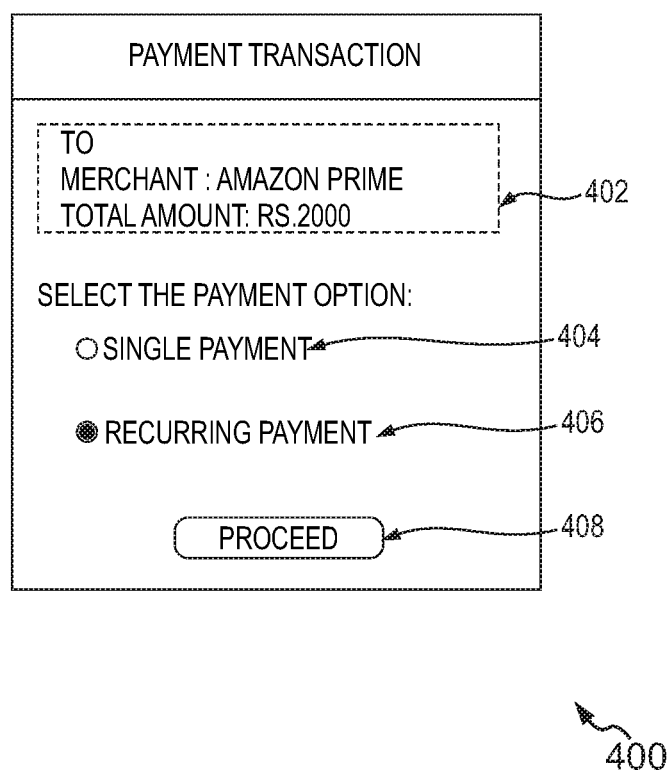

Referring now to FIG. 4A, an example representation of a user interface (UI) 400 depicting selection of a payment transaction type for while making payment to a merchant, is shown. The user 102 may perform payment to the merchant 120 either at a single instance or through recurring payments on a periodic basis. The user 102 can initiate payment to the merchant 120 through digital means by accessing an application, an online portal or a website associated with the merchant 120 as explained with reference to FIG. 2. The merchant 120 in conjunction with the acquirer server 110 may provide the UI 400 on a display screen of the user device 104 for receiving input from the user 102 based on the transaction type.

The UI 400 is depicted to display a payee information section 402 including the information related to the merchant 120. For example, the section 402 is depicted to include an identity of the merchant such as 'Merchant X', a payment amount associated with the purchase transaction to be '2000 Indian Rupees'. The payment amount associated with the purchase transaction may be the total payment amount charged by the merchant 120 to the user 102.

The UI 400 is further depicted to display two options 404 and 406 associated with text 'SINGLE PAYMENT' and 'RECURRING PAYMENT', respectively. The options 404 and the 406 refer to the payment transaction type. Further, each of the options 404 and 406 is associated with a radio button capable of receiving an input from the user 102 indicative of selection of the respective option by the user 102. The user 102 may provide an input such as, but not limited to, a touch input or a click input for selecting either one of the options depicted in the UI 400.

In the illustrative embodiment, the user 102 selects the option 406 to opt for the recurring payment transaction type (i.e., SI transaction type) to make payment to the merchant 120. Thereafter, the user 102 selects a button 408 associated with text 'PROCEED'. In one form, the selection of the option to pay the merchant 120 for recurring payments, i.e. the selection of the option 406 causes provisioning of another UI configured to request the user 102 to provide input related to the SI transaction type. Thus, the user 102 may be redirected to a UI 420 for providing input related to SI for registering to perform the SI transaction with the merchant 120.

FIG. 4B shows an example representation of the UI 420 for registering for the recurring payment to pay the merchant 120, in accordance with an example embodiment of the present disclosure. For example, the UI 420 is an example of the registration form provided on the display screen of the user device 104 associated with the user 102 for receiving the user inputs related to the recurring payment.

The UI 420 is depicted to include a user details section 422 which further includes form fields 424, 426, and 428 for receiving user input related to the user 102 to be registered for SI transaction. The form fields 424, 426, and 428 are depicted to be associated with text 'USER NAME', 'PHONE NUMBER', and 'E-MAIL', respectively. The form fields 424, 426, 428 may be configured to receive text input corresponding to the name, mobile phone number, and e-mail id from the user 102.

The UI 420 further includes a section 430 to receive information related to the SI transaction from the user 102. The section 430 of the UI 420 is depicted to include form fields 432, 434, and 436. The form fields 432, 434, and 436 are depicted to be associated with text 'NUMBER OF RECURRING PAYMENTS', 'RECURRING PAYMENT FREQUENCY', and 'PAYMENT AMOUNT' respectively. The form fields 432 and 434 are depicted to be associated with a drop-down list, however these can be customized in a variety of ways.

In the illustrative representation of FIG. 4B, the user 102 may provide a touch or click input on the drop-down list for selecting the number of recurring payments to be performed to pay the merchant 120. Upon selecting the drop-down list, the user 102 may be provided with a list including the number of recurring payments. In one example, the list depicting the number of recurring payments may be pre-defined by the merchant 120 or the acquirer server 110. Thus, the user 102 may select one option from the list including the number of recurring payments. Upon user selection, the number of recurring payments may be depicted in the form field 432, for example, 12, 24, 48, and the like.

Similarly, the user 102 may invoke the drop-down list for selecting the recurring payment frequency. Upon invoking the drop-down list, the user 102 may be provided with a list of pre-defined recurring payment frequencies for the user selection. In an embodiment, the recurring payment frequency may be pre-defined by the merchant 120 or the acquirer server 110. For example, the recurring payment frequency included in the list may be such as daily, weekly, fortnightly, monthly, quarterly, half-yearly, annually, and ad hoc. As such, the user 102 may provide a touch or click input for one recurring payment frequency from the list. Thus, upon selection, the recurring payment frequency is depicted in the form field. In one form, the user 102 may provide a type text input for selecting the recurring payment frequency.

Thereafter, the form field 436 may be dynamically filled by the application and/or website associated with the merchant 120 based on the total amount (see, 402, of FIG. 4A), selection of the number of recurring payments and the recurring payment frequency by the user 102. The payment amount in the form field 436 corresponds to the amount which needs to be debited from the payment account of the user 102 to the merchant account of the merchant 120 on the periodic basis. For example, the number of recurring payments may be '06', and the recurring payment frequency may be selected to be 'monthly' and payment amount may be '400 rupees'. Thus, the payment amount of 400 rupees may be debited for each recurring payment till the end of the number of recurring payments mentioned by the user 102.

Further, the UI 420 is depicted to include a payment card details section 438 for receiving payment card details associated with the user 102 for performing the recurring payment. The section 438 is depicted to include three options 440, 442, and 444 related to the payment card and associated with text 'DEBIT CARD', 'CREDIT CARD', and 'WALLET CARD', respectively. In general, the options 440, 442, and 444 refer to the payment card type. Each of the options 440, 442, and 444 is associated with a radio button capable of receiving an input indicative of selection of the respective option by the user 102, from the user 102. Thus, the user 102 may select one payment account from the options 440, 442, and 444 to perform recurring payment with the merchant 120.

The section 438 further includes form fields 446, 448, and 450 associated with text 'PAYMENT CARD NUMBER', 'EXPIRY DATE', and 'CARD VERIFICATION VALUE (CVV)', respectively, to receive payment card details subsequent to selection of the payment card type from the user 102. Thus, upon selection of the payment card type, the user 102 provides the payment card number, the expiry date, and the CVV in the form fields 446, 448, and 450, respectively. In one form, the payment card number may be depicted by masking certain digits/characters (e.g., "5321 XXXX XXXX 6413") in the form field 446. Also, the CVV value provided in the form field 450 may be depicted as * in the UI 420**.

Further, the UI 420 is depicted to include a check box 452 associated with text: "I HAVE READ AND AGREE TO THE TERMS AND CONDITIONS". The user 102 may be requested to provide an acceptance of the terms and conditions by selecting the check box 452 to confirm the input related to the recurring payments and also approve the various terms and conditions for debiting the payment account of the user 102 as per the input related to the recurring payment. Accordingly, the input related to the check box 452 may provide approval of the user 102 regarding the input related to the SI and also of the various terms and conditions to register for recurring payment. Thereafter, the user 102 selects a button 454 exemplarily depicted to be associated with text 'SUBMIT' to provide the input related to the recurring payment to the merchant 120 for registering and setting up of standing instruction for the recurring payment.

It must be noted that the plurality of form fields depicted in the UI 420 is shown only for illustrative purpose. Further, the UI 420 may include other form fields to receive corresponding details related to the user 102 for the recurring payment without deviating from the scope of the present disclosure.

Referring now to FIG. 5, a table 500 representing the unique data fields associated with the SI request for processing the recurring payment is shown, in accordance with an example embodiment of the present disclosure. The table 500 is explained herein for example purposes only to explain the unique data fields, and it can be configured in a variety of ways. In a non-limiting example, the unique data fields may be identified by the payment server 112 or the aggregator server 114 based on an ISO standard such as ISO 85831997 platform. For instance, the unique data fields may be referred to as ISO data fields. As explained with reference to FIG. 2, the payment server 112 (or the aggregator server 114) receives the unique data fields as part of the payment transaction request and based on presence of these fields in the transaction request, the aggregator server 114 identifies the payment transaction request as the SI request. The table 500 is depicted to include three columns 502, 504, and 506 for the unique data fields, the purpose of the unique data fields, and the corresponding values to be populated in the unique data fields, respectively. In an embodiment, the unique data fields may include a data element (DE), sub element (SE), and a sub-field (SF) which may be used for generating the SI request for the recurring payment. These fields are generally the reserved bit in a typical payment transaction request The column 502 of the unique data fields of the table 500 is depicted to include the five entries, such as, "DE 22 sf1", "DE 61 sf4", "DE 112 SE 22 sf1", "DE 48 SE 41 sf1", and "DE 48 SE 40 sf1".

In one example, the data field "DE 22 sf1" represents the point of service entry mode. For example, the data field "DE 22 sf1" may be assigned with a value (exemplary depicted to be '10') by the acquirer server 110 in the SI request. The payment server 112, the aggregator server 114, and the issuer server 108 may identify that the SI request is for the recurring payment based on the value associated in the unique data field "DE 22 sf1".

Further, the data field "DE 61 sf4" is indicative of the point of sale (POS) cardholder presence. For example, the unique data field "DE 61 sf4" may be associated with a value (exemplary depicted to be '4') by the acquirer server 110 in the SI request. Thus, the issuer server 108, the payment server 112, or the aggregator server 114 may identify the SI request as a card not present SI transaction or may identify card holder present transaction based on the value assigned in the data field "DE 61 sf4" of the SI request.

In an embodiment, the acquirer server 110 populates the unique data fields "DE 22 sf1" and "DE 61 sf4" based on seeking consent or permission from the user 102 through the second factor authentication for performing the recurring payments.

The data field "DE 112 SE 22 sf1" is indicative of the number of recurring payments (or number of SI debits including the first payment). The acquirer server 110 may assign a value to the data field "DE 112 SE 22 sf1" as mentioned by the user 102 while registering for the SI transaction. Further, the value to be assigned to the data field "DE 112 SE 22 sf1" may be prepended with '0'. For example, if the user 102 selects the number of recurring payments to be '5' in the registration form (i.e., in the UI 420), the data field "DE 112 SE 22 sf1" may be assigned with the value '05' in the SI request by the acquirer server 110.

The data field "DE 48 SE 41 sf1" is indicative of the recurring payment frequency (or frequency of SI). As such, the acquirer server 110 assigns a value to the data field "DE 48 SE 41 sf1" based on selection of the recurring payment frequency by the user 102 while registering. As explained in FIG. 2, the values to be populated in the data field "DE 48 SE 41 sf1" may be predefined for corresponding recurring payment frequencies (e.g., entries shown in the column 506 corresponding to the data field "DE 48 SE 41 sf1"). For example, if the user 102 wishes to pay to the merchant 120 on a monthly basis, the acquirer server 110 may assign the value '04' to the data field "DE 48 SE 41 sf1" to indicate monthly payment in the SI request.

Further, the data field "DE 48 SE 40 sf1" is indicative of the unique identifier in the SI request. As explained in reference with FIG. 2, the aggregator server 114 generates the unique identifier (such as the alphanumeric value) corresponding to the SI request and transmits the SI request along with the unique identifier to the issuer server 108 for processing of the recurring payment. More specifically, the aggregator server 114 assigns the unique identifier in the data field "DE 48 SE 40 sf1" of the SI request. In an embodiment, the unique identifier may include a static value and the recurring payment frequency represented by an alphabet. Similarly, the alphabets for the recurring payment frequency may also be predefined by the payment server 112, or the aggregator server 114 (e.g., entries shown in column 506 corresponding to the data field "DE 48 SE 41 sf1"). For example, the unique identifier (or the alphanumeric value) generated by the aggregator server 114 may be 'SID0000037' in which 'SI' represents a static value and 'D' corresponds to the recurring payment frequency to be monthly.

It shall be noted that the table 500 may include other values than those shown in the column 506. The values or the unique data fields are described herein for explanation purpose and may vary without losing scope of the present disclosure. Further, the unique data fields used to represent SI transaction may be customized differently than those shown in the table 500. For example, an additional data field can represent whether there is a variation in the transaction amount in the current SI transaction request. For instance, if the SI is set for deduction of $100, every week, and the additional data field (not shown) is set as part of the transaction request and the payment amount is $125, the current transaction request can still be considered valid. Similarly, the additional data field may also represent a percentage variation to the transaction amount in the current transaction based on certain codes. For example, the additional data field may include a certain percentage value (e.g., 40%), and if the transaction amount provided in the transaction has a variation up to the 40% of the already setup transaction amount, the current transaction request can still be identified as the valid recurring transaction.

Figure 6A:
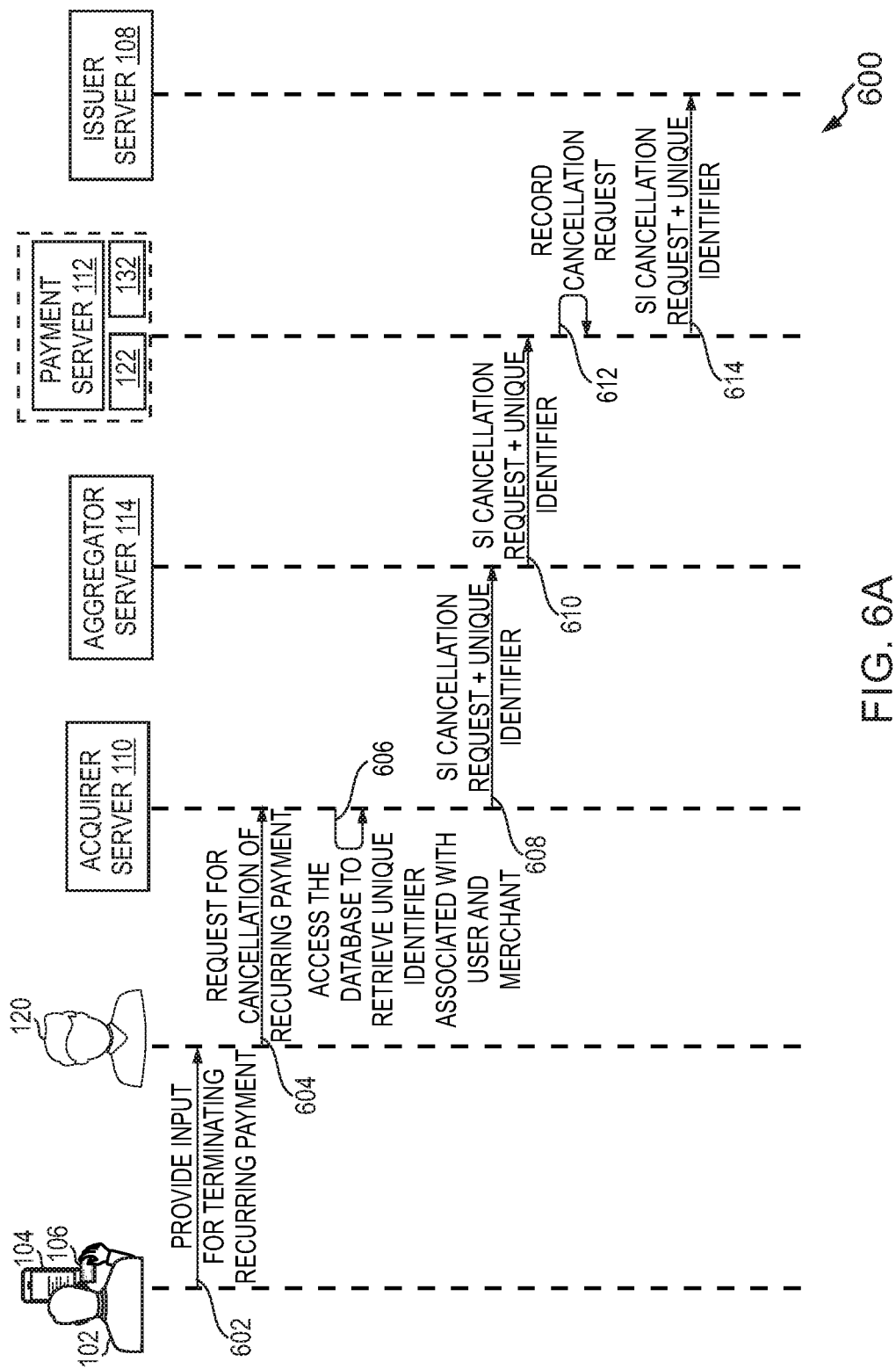
FIGS. 6A and 6B are a simplified sequential flow diagram for cancellation of the recurring payments from the payment account of the user to the merchant account of the merchant, in accordance with an example embodiment of the present disclosure.
Figure 6B:
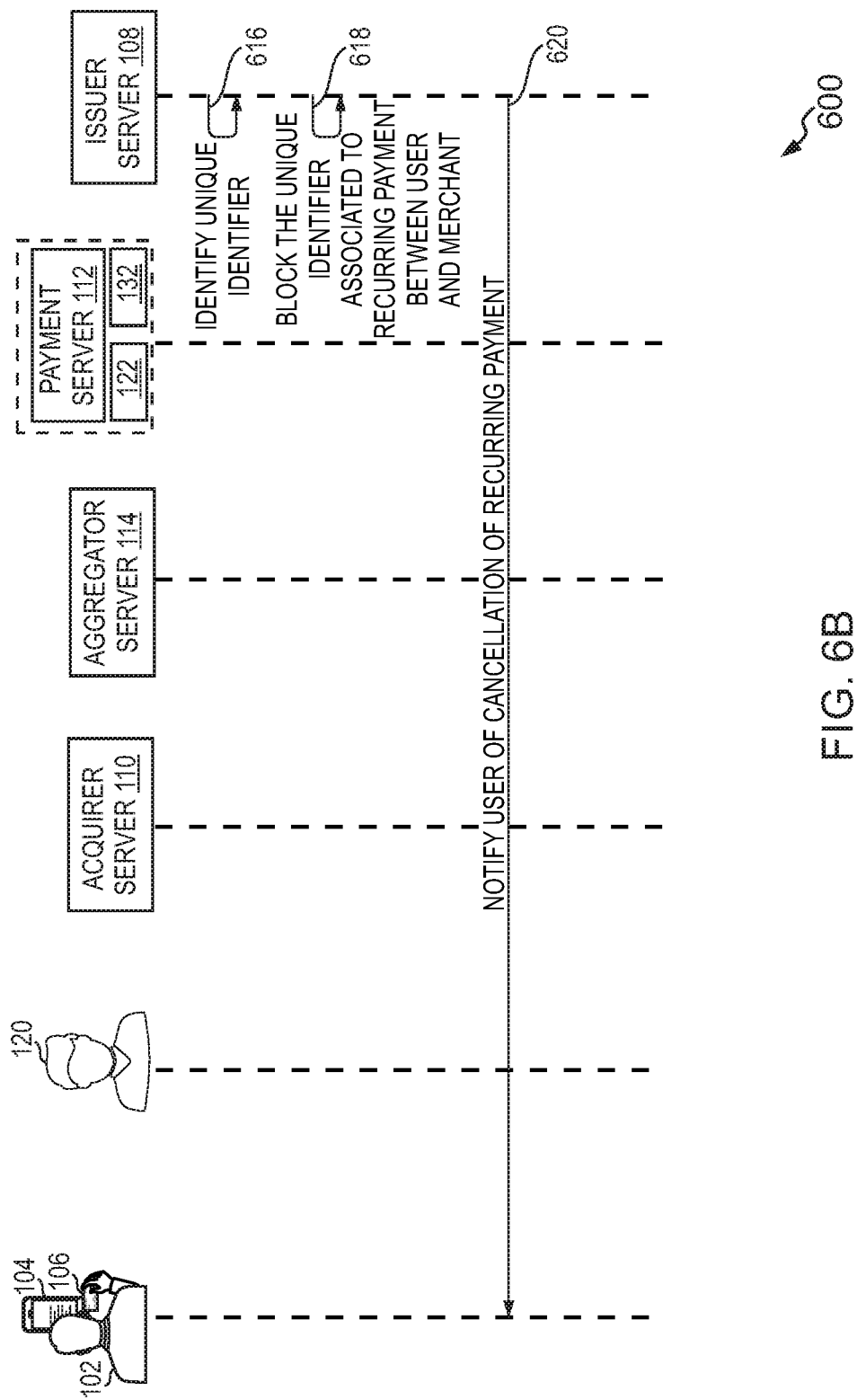

FIGS. 6A and 6B represent a sequential flow diagram 600 for cancellation of the recurring payments from the payment account of the user 102 to the merchant account of the merchant 120, in accordance with an example embodiment of the present disclosure. The process starts at 602.

At 602, the user 102 accesses the application or the website associated with the merchant 120 to provide inputs for terminating the recurring payment (e.g., standing instruction cancellation request) with the merchant 120. The user 102 may select corresponding option or provide input in the application or the website for terminating the recurring payment which is transmitted to the merchant 120.

At 604, the merchant 120 triggers cancellation of the recurring payment associated with the user 102 upon receiving the inputs for terminating the recurring payment from the user 102. More specifically, the merchant 120 may identify the unique identifier stored in the database corresponding to the user 102 and may send a request to the acquirer server 110 for processing the cancellation of the recurring payment with the user 102.

At 606, the acquirer server 110 with access to the database, retrieves the unique identifier associated with the user 102 and the merchant 120 which is stored as receipt of successful registration of the user 102 for the recurring payment.

At 608, the acquirer server 110 transmits a SI cancellation request along with the unique identifier to the payment server 112 for processing the cancellation of the recurring payment. More specifically, the SI cancellation request may be generated by the acquirer server 110 by populating the corresponding unique data fields as explained with reference to FIG. 2. Further, the unique identifier may be populated in the data field (such as the data field "DE 48 SE 40 sf1") of the SI cancellation request. Thereafter, the acquirer server 110 would transmit the SI cancellation request appended with the unique identifier to the payment server 112.

At 610, the payment server 112 sends the SI cancellation request appended with the unique identifier to the aggregator server 114. At 612, the aggregator server 114 may validate the unique identifier assigned in the data field "DE 48 SE 40 sf1" and record the SI cancellation request in the database associated with the aggregator server 114. Further, the aggregator server 114 may identify the issuer server 108 associated with the user 102.

At 614, the aggregator server 114 sends the SI cancellation request along with the unique identifier to the issuer server 108 to authenticate the cancellation of the recurring payment from the user 102 to the merchant 120.

At 616, the issuer server 108 identifies the unique identifier appended to the SI cancellation request. In other words, the issuer server 108 may access the stored unique identifier associated with the user 102 and the merchant 120 from the database and match it with the unique identifier in the SI cancellation request.

At 618, the issuer server 108 blocks the unique identifier associated with the user 102 and the merchant 120 in the database of the issuer server 108 which confirms the cancellation of the recurring payment. Therefore, for the SI request initiated by the merchant 120 for subsequent recurring payments, the issuer server 108 may validate the unique identifier in the SI request and decline the SI request for subsequent recurring payments initiated by the merchant 120.

At 620, the issuer server 108 provides a notification on successful cancellation of the recurring payments to the user 102. In one embodiment, the acquirer server 110, the merchant 120, and the payment server 112 may also be provided with the notification indicative of successful cancellation of the recurring payments from the user 102 to the merchant 120. Therefore, the merchant 120 may not initiate the acquirer server 110 to generate the SI request for subsequent recurring payments upon cancellation of the recurring payment between the user 102 and the merchant 120.

Figure 7:
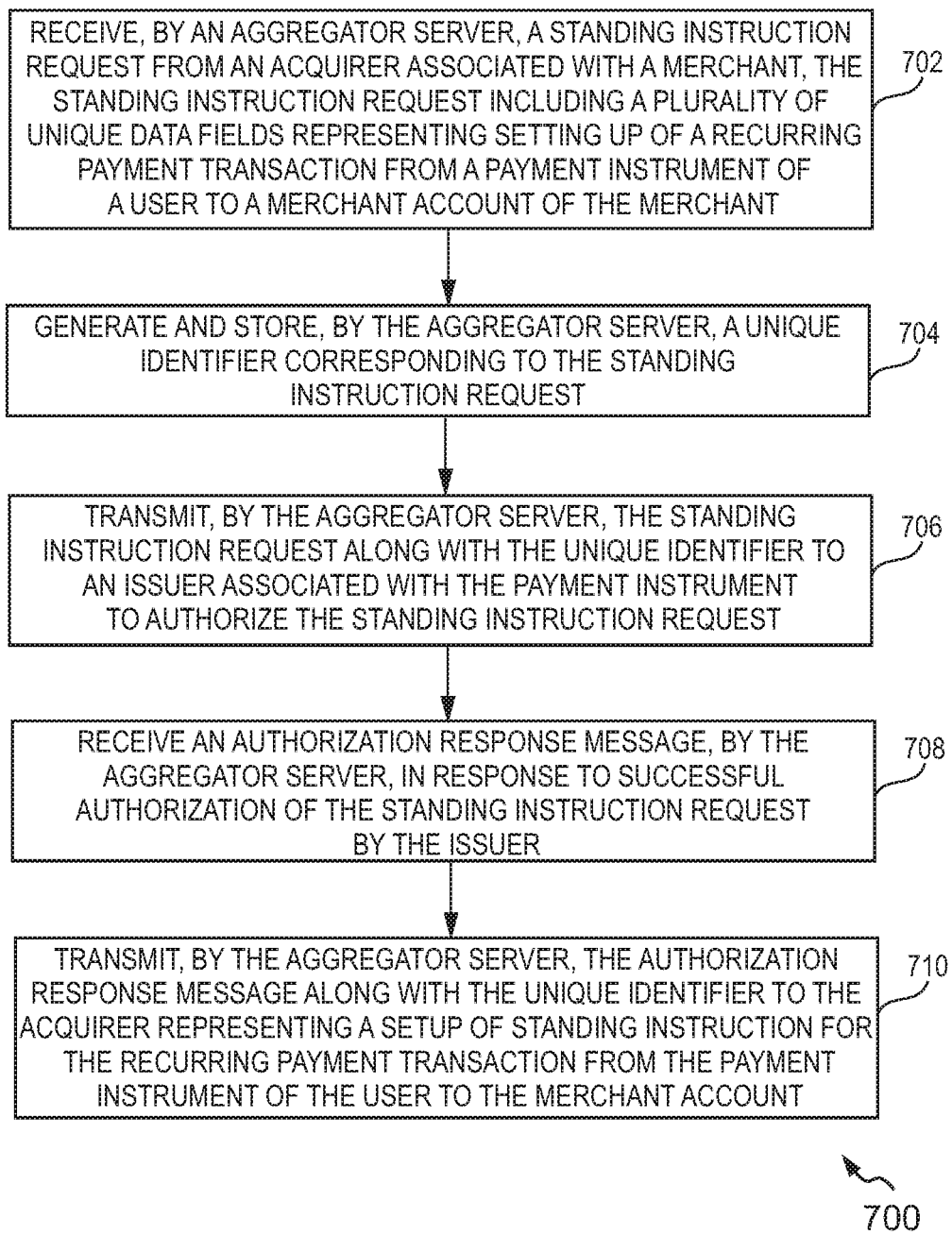
FIG. 7 is a simplified flow diagram of a method for setup of recurring payment transactions from payment account of the user to the merchant account of the merchant, in accordance with an example embodiment of the present disclosure.

FIG. 7 illustrates a flow diagram of a method 700 for setup of recurring payments from payment account of the user 102 to the merchant account of the merchant 120, in accordance with an example embodiment of the present disclosure. The method 700 depicted in the flow diagram may be executed by, for example, the aggregator server 114. In an embodiment, the aggregator server 114 can be implemented in the payment server 112. Operations of the flow diagram of method 700, and combinations of operation in the flow diagram of method 700, may be implemented by, for example, hardware, firmware, a processor, circuitry, and/or a different device associated with the execution of software that includes one or more computer program instructions. It is noted that the operations of the method 700 can be described and/or practiced by using a system other than these aggregator servers. The method 700 starts at operation 702.

At 702, the method 700 includes receiving, by the aggregator server 114114, the SI request originated from the acquirer server 110 associated with the merchant 120. The SI request includes the plurality of unique data fields which represents setting up of the recurring payment from the payment instrument of the user 102 to the merchant account of the merchant 120. The SI request is initiated after the user 102 has sought approval for availing SI facility and given his consent as described with reference to FIGS. 2A-2C. As explained with reference to FIGS. 2A-2C, the SI request may be generated as part of the first recurring payment by the acquirer server 110 and transmitted to the payment server 112 associated with the payment network 116. In an embodiment, a first recurring payment request may include, among other things, transaction amount, information of payment account of the user 102, merchant account of the merchant 120, and SI request in form of the plurality of unique data fields. Examples of the plurality of unique data fields are described with reference to FIG. 5.

At 704, the method 700 includes generating and storing, by the aggregator server 114, the unique identifier corresponding to the SI request. The unique identifier is generated by the aggregator server 114 upon receiving the SI request for the recurring payment associated with the user 102 and the merchant 120. Further, the aggregator server 114 is configured to store the unique identifier in the database of the aggregator server 114. For instance, the aggregator server 114 stores the unique identifier (e.g., UIn) for an SI transaction from payment account of the user (e.g., Un) to a merchant account of the merchant (e.g., Mn).

At 706, the method 700 includes transmitting, by the aggregator server 114, the SI request along with the unique identifier to the issuer server 108 associated with the payment account of the user 102 to authorize the SI request for processing the recurring payment from the payment account of the user 102 to the merchant account of the merchant 120. The issuer server 108 processes the first recurring payment upon approving the SI request based on the authentication of the user 102. As such, processing the first payment enables setup of the SI for the recurring payment.

At 708, the method 700 includes receiving an authorization response message, by the aggregator server 114, in response to successful authorization of the SI request by the issuer server 108. The issuer server 108 sends an authorization response message (which is indicative of approval of the SI request and processing of the first recurring payment) to the aggregator server 114. The aggregator server 114 may record the unique identifier as the receipt of successful authorization by the issuer server 108.

At 710, the method 700 includes transmitting, by the aggregator server 114, the authorization response message to the acquirer server 110 for the completed setup of the SI for the recurring payment from the payment account of the user 102 to the merchant account of the merchant 120. The payment server 112 transmits the authorization response message along with the unique identifier to the acquirer server 110 which represents a completed setup of the SI for the recurring payment. In an embodiment, the acquirer server 110 may transmit the unique identifier to the merchant 120 for invoking the subsequent recurring payment.

Figure 8:
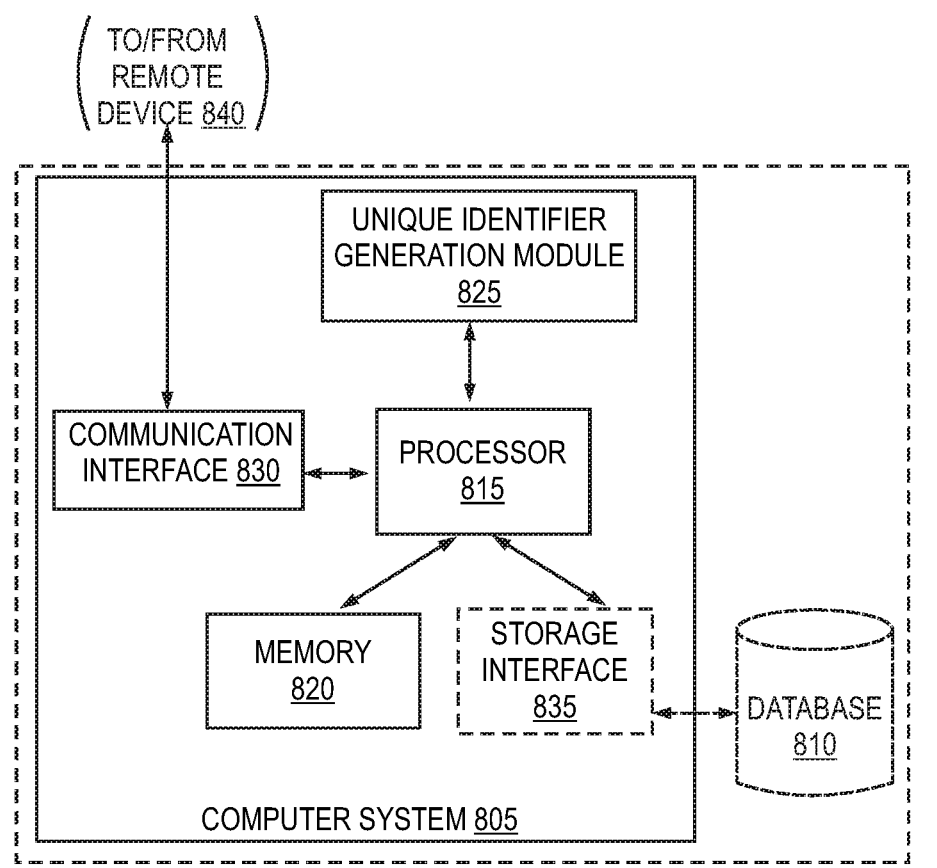
FIG. 8 is a simplified block diagram of an aggregator server for processing the SI request, in accordance with one embodiment of the present disclosure.

FIG. 8 is a simplified block diagram of a server system 800 for generating the unique identifier for the standing instruction (SI) request, in accordance with one embodiment of the present disclosure. The server system 800 is an example of the aggregator server 114. The server system 800 is communicably liked to a plurality of payment networks (such as the payment networks 116, 126 and 136 of FIG. 1), the issuer server 108 and the acquirer server 110. Further, the server system 800 includes a computer system 805 and a database 810.

The computer system 805 includes at least one processor 815 for executing instructions. Instructions may be stored in, for example, but not limited to, a memory 820. The processor 815 may include one or more processing units (e.g., in a multi-core configuration). The processor 815 is operatively coupled to a communication interface 830 such that computer system 805 is capable of communicating with a remote device 840 such as issuer server 108, the payment servers 112, 122 and 132, and the acquirer server 110. For example, the communication interface 830 may receive the SI request for the recurring payment from the acquirer server 110 via the payment servers 112, 122 and 132.

The processor 815 may also be operatively coupled to the database 810. The database 810 is any computer-operated hardware suitable for storing and/or retrieving data, such as, but not limited to, transaction data generated as part of sales activities conducted over the network including data relating to merchants, account holders or customers, and agents. The database 810 may include corresponding values (as depicted in the table 500 of FIG. 5) which are pre-defined for each unique data field. The database 810 may also store the unique identifier generated corresponding to the SI request for various merchants and customers. The database 810 may also store information, related to the user 102 and the merchant 120.

In some embodiment, the database 810 is integrated within the computer system 805. For example, the database 810 may include multiple storage units such as hard disks and/or solid-state disks in a redundant array of inexpensive disks (RAID) configuration. The database 810 may include a storage area network (SAN) and/or a network attached storage (NAS) system. In some embodiments, the database 810 is integrated within the computer system 805. For example, the computer system 805 may include one or more hard disk drives as the database 810. In other embodiments, the database 810 is external to the computer system 805 and may be accessed by the computer system 805 using a storage interface 835. The storage interface 835 is any component capable of providing the processor 815 with access to the database 810. The storage interface 835 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 815 with access to the database 810.

The processor 815 of the computer system 805 is configured to identify the unique data fields and determine the corresponding values to be populated for identifying the payment transaction to be a SI payment transaction type. The processor 815 coupled to the communication interface 830 may send the corresponding values to the acquirer server 110, and the issuer server 108 for processing the recurring payments. The processor 815 may be configured to receive the SI request for the recurring payment initiated by the acquirer server 110 which is populated with the corresponding values in the unique data fields. Thus, the processor 815 may identify the SI request corresponding to the recurring payment between the user 102 and the merchant 120 based upon validating the corresponding values in the unique data fields of the SI request.

Further, a unique identifier generation module 825 of the computer system 805 generates the unique identifier (e.g., as shown in FIG. 5) corresponding to the SI request and stores it in the database 810. The processor 815 may be configured to assign the unique identifier to the corresponding unique data field of the of the SI request. Thereafter, the processor 815 may route the SI request appended with the unique identifier to the issuer server 108 based upon identifying the issuer server 108 associated with the user 102. Further, the processor 815 may identify the SI request initiated for the next recurring payment between the user 102 and the merchant 120 and access the database 810 to retrieve the unique identifier stored in the database 810. The processor 815 then, may append the unique identifier corresponding to the user 102 and the merchant 120 to the SI request for processing the subsequent recurring payments.

Figure 9:
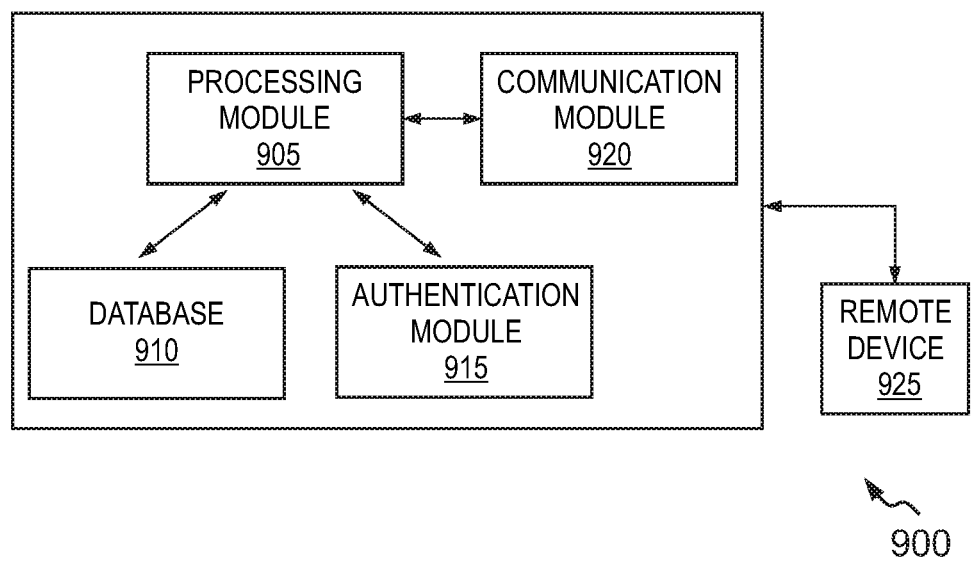
FIG. 9 is a simplified block diagram of an issuer server, in accordance with one embodiment of the present disclosure.

FIG. 9 is a simplified block diagram of an issuer server 900 for facilitating recurring customer payments to a merchant, in accordance with an example embodiment of the present disclosure. The issuer server 900 is an example of the issuer server 108 of FIG. 1. The issuer server 900 is associated with an issuer bank/issuer, in which a customer 102 may have an account, which provides an option to the user 102 to pay a merchant (e.g., the merchant 120) for the recurring payments using the Standing Instruction (SI). The issuer server 900 includes a processing module 905 operatively coupled to a database 910, an authentication module 915, and a communication module 920. The components of the issuer server 900 provided herein may not be exhaustive, and the issuer server 900 may include more or fewer components than those depicted in FIG. 9. Further, two or more components may be embodied in one single component, and/or one component may be configured using multiple sub-components to achieve the desired functionalities. Some components of the issuer server 900 may be configured using hardware elements, software elements, firmware elements, and/or a combination thereof.

The database 910 is configured to store machine executable instructions to be accessed by the processing module 905. Additionally, the database 910 stores information related to the customer (i.e., the user 102) such as, contact information of the customer, payment account number (PAN), BINs, payment card details, internet banking information, PIN, mobile personal identification number (MPIN) for mobile banking, and the like. This information is retrieved by the processing module 905 for cross-verification during processing of the recurring payments.

The processing module 905 is configured to communicate with one or more remote devices such as a remote device 925 using the communication module 920 over a network such as the network 118 or the payment network 116 of FIG. 1. The examples of the remote device 925 include a user device (e.g., the user device 104), the payment server 112, the acquirer server 110, and the server system 800, other computing systems of the payment network 116 and the like. The communication module 920 is capable of facilitating such operative communication with the remote devices using API (Application Program Interface) calls.

The processing module 905, in conjunction with the authentication module 915, is configured to validate the payment account information associated with the user 102 such as the payment card information, the PIN (e.g., whether the four-digit numeric code matches the PIN issued by the issuer), and the like. The authentication module 915 is also configured to perform authentication (provide a second factor authentication message to the user 102) of customers using OTP or any such 3DS. Upon successful authentication only, the processing module 905 is configured to confirm approval of the user 102 (registration of the user 102) for performing the recurring payments from the payment account of the user 102 by the merchant 120 on a periodic basis.

Further, the processing module 905 is configured to approve the SI request received by the server system 800 for the recurring payment. Thus, the processing module 905 processes the first payment from the payment account of the user 102 to the merchant 120 based on successful authentication of the user 102 through the second factor authentication. Further, the processing module 905 may be configured to utilize the communication module 920 to provide the notification including the unique identifier to the aggregator server 114 for subsequent forwarding of the unique identifier to the merchant bank. It is noted that the customer authentication may be precluded for subsequent recurring payments to the first payment. In other words, the processing module 905 is configured to authenticate the subsequent recurring payment based on validating the unique identifier in the SI request initiated for subsequent recurring payment. In one scenario, the processing module 905 is configured to block the unique identifier stored in the database based upon receiving the cancellation request initiated by the user 102 to terminate the recurring payment to the merchant 120.

Figure 10:
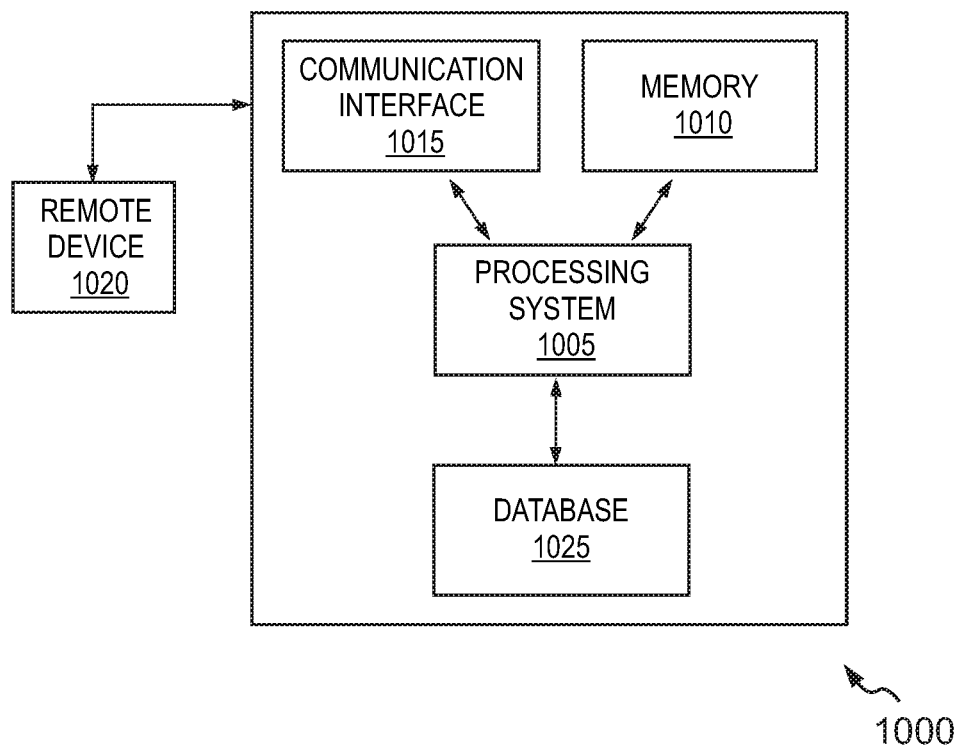
FIG. 10 is a simplified block diagram of a payment server, in accordance with an embodiment of the present disclosure.

FIG. 10 is a simplified block diagram of a payment server 1000, for performing the recurring payments, in accordance with one embodiment of the present disclosure. The payment server 1000 is an example of the payment servers 112, 122 and 132 of FIG. 1. In one embodiment, the payment server 1000 may be embodied in the payment network, such as the payment network 116 of FIG. 1. The payment network 116 may be used by the payment server 1000, the issuer server 900, and the acquirer server 110 as a payment interchange network. Examples of payment interchange network include, but not limited to, Mastercard® payment system interchange network. The payment server 1000 includes a processing system 1005 configured to extract programming instructions from a memory 1010 to provide various features of the present disclosure. The components of the payment server 1000 provided herein may not be exhaustive and that the payment server 1000 may include more or fewer components than that of depicted in FIG. 10. Further, two or more components may be embodied in one single component, and/or one component may be configured using multiple sub-components to achieve the desired functionalities. Some components of the payment server 1000 may be configured using hardware elements, software elements, firmware elements and/or a combination thereof.

Via a communication interface 1015, the processing system 1005 receives information from a remote device 1020 such as the server system 800, issuer server 900, or the acquirer server 110. The payment server 1000 includes a database 1025. The database 1025 includes values generated respective to the unique data fields. The payment server 1000 may be configured to identify the SI request received from the acquirer server 110 as the recurring payment based on validating the values associated with the unique data fields. In one embodiment, the payment server 1000 may also perform similar operations as performed by the aggregator server 114 or the server system 800 for processing the recurring payments.

Figure 11:
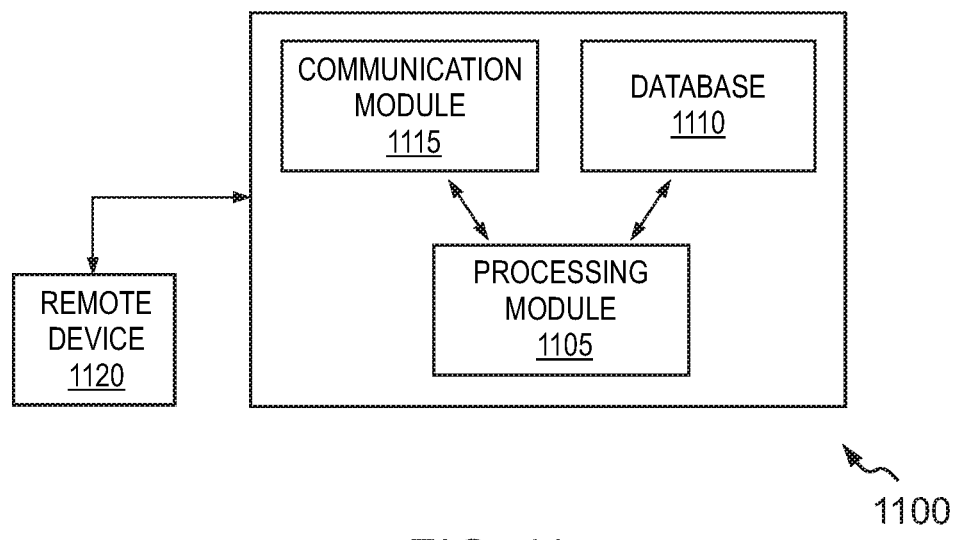
FIG. 11 is a simplified block diagram of an acquirer server, in accordance with an embodiment of the present disclosure.

FIG. 11 is a simplified block diagram of an acquirer server 1100 used for facilitating recurring customer payments to the merchants, in accordance with an example embodiment of the present disclosure. The acquirer server 1100 is associated with the acquirer bank of a merchant (e.g., the merchant 120) where the merchant has established an account to accept payment from customers (e.g., the user 102), such as recurring payments using SI. The acquirer server 1100 is an example of the acquirer server 110 of FIG. 1. The acquirer server 1100 includes a processing module 1105 communicably coupled to a database 1110 and a communication module 1115. The components of the acquirer server 1100 provided herein may not be exhaustive, and that the acquirer server 1100 may include more or fewer components than that of depicted in FIG. 11. Further, two or more components may be embodied in one single component, and/or one component may be configured using multiple sub-components to achieve the desired functionalities. Some components of the acquirer server 1100 may be configured using hardware elements, software elements, firmware elements, and/or a combination thereof.

The database 1110 includes data related to each merchant, such as, but not limited to, a merchant primary account number (PAN), a merchant name, a merchant category code (MCC), a merchant city, a merchant postal code, a merchant brand name, a merchant ID, and the like. The processing module 1105 may be configured to store and update such merchant information in the database 1110 for later retrieval. In an embodiment, the communication module 1115 is capable of facilitating operative communication with a remote device 1120 (e.g., user device 104, the payment server 1000, or the server system 800) using API calls. The communication may be achieved over a communication network, such as the network 118.

The processing module 1105 in conjunction with the communication module 1115 may be configured to cause provisioning of an interface, such as an application interface and/or online/web interface (as shown in FIGS. 4A and 4B) to the user 102. Upon receiving the user inputs, the acquirer server 1100 may be configured to send the registration request to the issuer server 900 via the payment server 1000 for seeking permission from the user 102 to process the recurring payment by the merchant 120 on a periodic basis. Further, the processing module 1105 may be configured to process the user inputs related to the recurring payments and generate the SI request by populating the corresponding values in the unique data fields of the SI request. The processing module 1105 may be configured to send the SI request to the payment server 1000 for processing of the recurring payment. Upon processing of the SI request by the issuer server 900, the acquirer server 1100 in conjunction with the communication module 1115 may receive the unique identifier for storing the database 1110.

Further, the acquirer server 1100 would initiate the subsequent recurring payments based on the unique identifier stored in the database 1110. In an embodiment, the processing module 1105 may be configured to provide an application interface to the user 102 who wants to terminate the recurring payments to the merchant 120 for receiving the user input related to cancellation. The processing module 1105 may generate the SI cancellation request by populating the unique data fields with corresponding values and the unique identifier.

In some embodiments, the processing module 1105 is configured to receive the debited transaction amount from the payment server 1000 or the issuer server 900 using the communication module 1115. Thereafter, the processing module 1105 may retrieve merchant PAN from the database 1110 to credit the transaction amount in the merchant account of the merchant 120. Further, the processing module 1105 may be configured to send the transaction status to the merchant 120.

Figure 12:
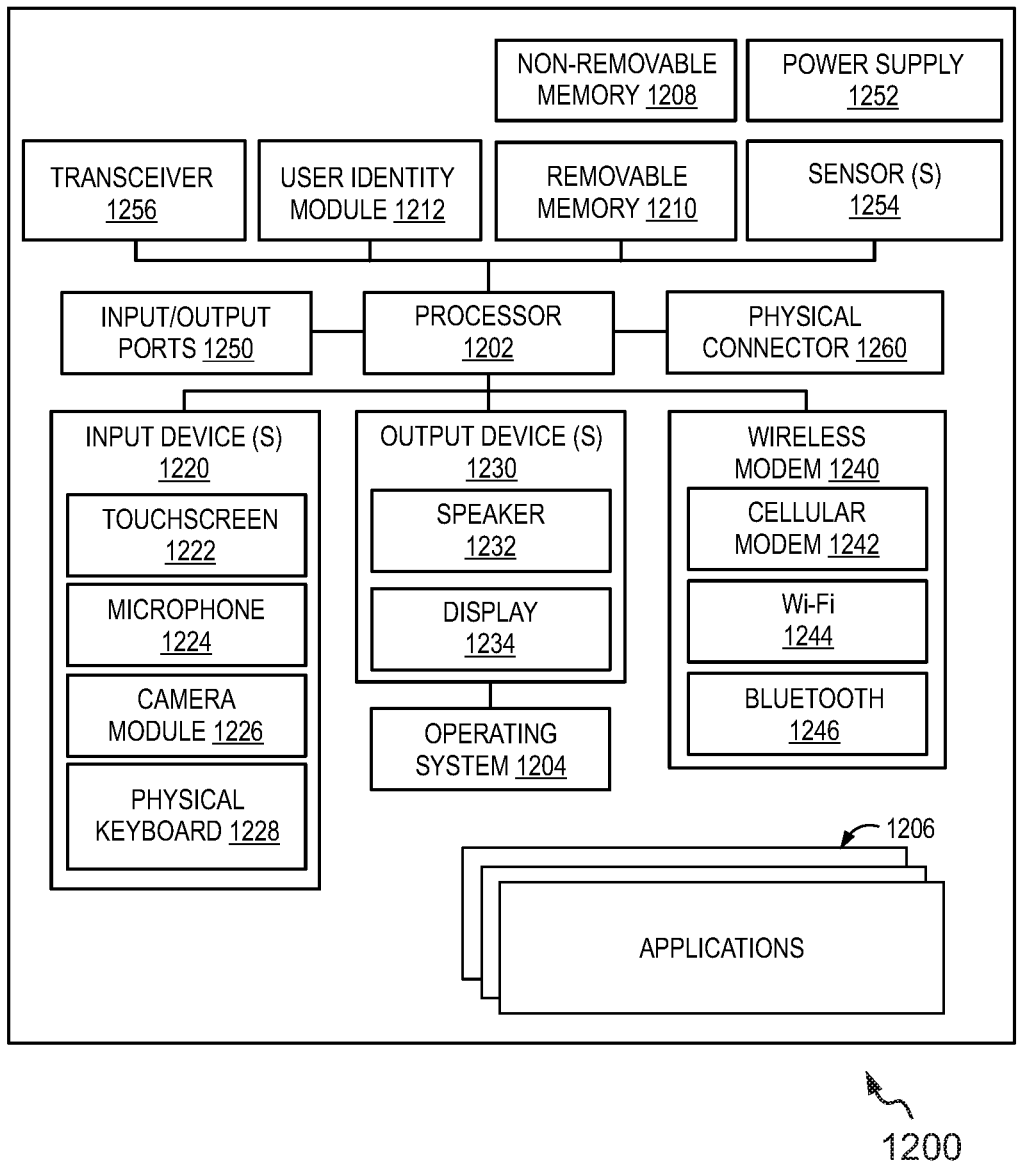
FIG. 12 is a simplified block diagram of a user device capable of implementing at least some embodiments of the present disclosure.

FIG. 12 shows simplified block diagram of an electronic device 1200 capable of implementing the various embodiments of the present disclosure. For example, the electronic device 1200 may correspond the user device 104. The electronic device 1200 is depicted to include one or more applications 1206.

It should be understood that the electronic device 1200 as illustrated and hereinafter described is merely illustrative of one type of device and should not be taken to limit the scope of the embodiments. As such, it should be appreciated that at least some of the components described below in connection with the electronic device 1200 may be optional and thus in an example embodiment may include more, less or different components than those described in connection with the example embodiment of the FIG. 12.

The illustrated electronic device 1200 includes a controller or a processor 1202 (e.g., a signal processor, microprocessor, ASIC, or other control and processing logic circuitry) for performing such tasks as signal coding, data processing, image processing, input/output processing, power control, and/or other functions. An operating system 1204 controls the allocation and usage of the components of the electronic device 1200 and supports for one or more payment application programs (see, the applications 1206), that implement one or more of the innovative features, such as providing an interface for requesting to register for recurring payment, or for providing a choice related to choosing the payment type (e.g., as shown in FIGS. 4A, and 4B). The payment application program may enable providing an input related to the SI to facilitate recurring payments from a customer to a merchant, as described herein. In addition, the applications 1206 may include common mobile computing applications (e.g., telephony applications, email applications, calendars, contact managers, web browsers, and messaging applications) or any other computing application.

The illustrated electronic device 1200 includes one or more memory components, for example, a non-removable memory 1208 and/or a removable memory 1210. The non-removable memory 1208 and/or the removable memory 1210 may be collectively known as database in an embodiment. The non-removable memory 1208 can include RAM, ROM, flash memory, a hard disk, or other well-known memory storage technologies. The removable memory 1210 can include flash memory, smart cards, or a Subscriber Identity Module (SIM). The one or more memory components can be used for storing data and/or code for running the operating system 1204 and the applications 1206. The electronic device 1200 may further include a user identity module (UIM) 1212. The UIM 1212 may be a memory device having a processor built in. The UIM 1212 may include, for example, a subscriber identity module (SIM), a universal integrated circuit card (UICC), a universal subscriber identity module (USIM), a removable user identity module (R-UIM), or any other smart card. The UIM 1212 typically stores information elements related to a mobile subscriber. The UIM 1212 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 1200 can support one or more input devices 1220 and one or more output devices 1230. Examples of the input devices 1220 may include, but are not limited to, a touch screen/a display screen 1222 (e.g., capable of capturing finger tap inputs, finger gesture inputs, multi-finger tap inputs, multi-finger gesture inputs, or keystroke inputs from a virtual keyboard or keypad), a microphone 1224 (e.g., capable of capturing voice input), a camera module 1226 (e.g., capable of capturing still picture images and/or video images) and a physical keyboard 1228. Examples of the output devices 1230 may include but are not limited to a speaker 1232 and a display 1234. Other possible output devices can include piezoelectric or other haptic output devices. Some devices can serve more than one input/output function. For example, the touch screen 1222 and the display 1234 can be combined into a single input/output device.

A wireless modem 1240 can be coupled to one or more antennas (not shown in the FIG. 12) and can support two-way communications between the processor 1202 and external devices, as is well understood in the art. The wireless modem 1240 is shown generically and can include, for example, a cellular modem 1242 for communicating at long range with the mobile communication network, a Wi-Fi compatible modem 1244 for communicating at short range with an external Bluetooth-equipped device or a local wireless data network or router, and/or a Bluetooth-compatible modem 1246. The wireless modem 1240 is typically configured for communication with one or more cellular networks, such as a GSM network for data and voice communications within a single cellular network, between cellular networks, or between the electronic device 1200 and a public switched telephone network (PSTN).

The electronic device 1200 can further include one or more input/output ports 1250, a power supply 1252, one or more sensors 1254 for example, an accelerometer, a gyroscope, a compass, or an infrared proximity sensor for detecting the orientation or motion of the electronic device 1200 and biometric sensors for scanning biometric identity of an authorized user, a transceiver 1256 (for wirelessly transmitting analog or digital signals) and/or a physical connector 1260, which can be a USB port, IEEE 1294 (FireWire) port, and/or RS-232 port. The illustrated components are not required or all-inclusive, as any of the components shown can be deleted and other components can be added.

The disclosed embodiments with reference to FIGS. 1 to 12, or one or more operations of the method 700 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the disclosure has been described with reference to specific exemplary embodiments, it is noted that various modifications and changes may be made to these embodiments without departing from the broad spirit and scope of the disclosure. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 800 and its various components such as the computer system 805 and the database 810 may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-RA/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the invention, as discussed above, may be practiced with steps and/or operations in a different order, and/or with hardware elements in configurations, which are different than those which are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method, comprising:
   receiving, by an aggregator server, a standing instruction request from an acquirer server associated with a merchant, the standing instruction request comprising a plurality of unique data fields representing setting up of a recurring payment transaction from a payment instrument of a user to a merchant account of the merchant;
   upon receipt of the standing instruction request comprising the plurality of unique data fields, generating and storing, by the aggregator server, a unique identifier corresponding to the standing instruction request;
   transmitting, by the aggregator server, the standing instruction request along with the unique identifier to an issuer server associated with the payment instrument to authorize the standing instruction request;
   receiving an authorization response message, by the aggregator server, in response to successful authorization of the standing instruction request by the issuer server; and
   transmitting, by the aggregator server, the authorization response message along with the unique identifier to the acquirer server representing a setup of a standing instruction for the recurring payment transaction from the payment instrument of the user to the merchant account of the merchant,
   wherein the aggregator server, the acquirer server and the issuer server are different servers.

2. The computer-implemented method as claimed in claim 1, further comprising:
   receiving, by the aggregator server, a payment transaction request for a subsequent recurring payment transaction from the acquirer server;
   checking if the payment transaction request comprises the plurality of unique data fields generated in accordance with an already setup standing instruction for the recurring payment transaction from the payment instrument to the merchant account;
   determining, by the aggregator server, validity of the plurality of unique data fields present in the payment transaction request to determine that the payment transaction request is associated with the standing instruction for the recurring payment transaction;
   upon successful validation, accessing a database linked with the aggregator server, to retrieve the unique identifier associated with the recurring payment transaction; and
   sending, by the aggregator server, the payment transaction request appended with the unique identifier to the issuer server, wherein the issuer server processes the subsequent recurring payment transaction from the payment instrument to the merchant account without additional authentication of the user by matching the unique identifier received from the aggregator server with a stored unique identifier accessible to the issuer server.

3. The computer-implemented method as claimed in claim 2, wherein the aggregator server is communicably linked with a plurality of payment networks, and wherein
   when the payment instrument is a first payment instrument associated with a first payment network, receiving the payment transaction request from the acquirer server comprises receiving the payment transaction request via a payment server of the first payment network, the payment transaction request processed at least in the first payment network, or
   when the payment instrument is a second payment instrument associated with a second payment network, receiving the payment transaction request from the acquirer server comprises receiving the payment transaction request via a payment server of the second payment network, the payment transaction request processed at least in the second payment network, wherein the first payment instrument is different from the second payment instrument, and the first payment network is different from the second payment network.

4. The method as claimed in claim 3, further comprising generating one or more additional unique identifiers for a pair of the payment instrument and the merchant account, where the one or more additional unique identifiers are generated based at least on a combination of the merchant account, the payment instrument and one or more transaction amounts.

5. The computer-implemented method as claimed in method 2, wherein the plurality of unique data fields is included in reserved bits of the payment transaction request received from the acquirer server, and wherein the plurality of unique data fields comprises at least one field indicating a variation in a transaction amount for the standing instruction.

6. The computer-implemented method as claimed in claim 1, wherein the standing instruction request is part of a first recurring payment request and the method further comprising:
performing an authentication of the user through a second factor authentication prior to generation of the standing instruction request; and
transmitting an authentication response to the acquirer server associated with the merchant in response to successful authentication of the user through the second factor authentication which provides permission to the merchant to initiate instructions for the recurring payment transaction from the payment instrument of the user to the merchant account of the merchant.

7. The computer-implemented method as claimed in claim 1, further comprising:
receiving, by the aggregator server, a standing instruction cancellation request appended with the unique identifier from the acquirer server, wherein the standing instruction cancellation request is initiated by the acquirer server based upon a user input for terminating the recurring payment transaction from the payment instrument of the user to the merchant account;
identifying, by the aggregator server, the unique identifier associated with the recurring payment transaction between the payment instrument and merchant account from a database linked with the aggregator server; and
sending the standing instruction cancellation request to the issuer server for blocking the unique identifier associated with the recurring payment transaction from the payment instrument to the merchant account.

8. An aggregator server for processing standing instructions payments, the aggregator server comprising:
a communication interface;
a memory comprising executable instructions; and
a processor communicatively coupled to the communication interface and configured to execute the instructions to cause the aggregator server to at least
receive a standing instruction request from an acquirer server associated with a merchant, the standing instruction request comprising a plurality of unique data fields representing setting up of a recurring payment transaction from a payment instrument of a user to a merchant account of the merchant,
generate and store a unique identifier corresponding to the standing instruction request associated with a pair of the payment instrument and the merchant account,
transmit the standing instruction request along with the unique identifier to an issuer server associated with the payment instrument to authorize the standing instruction request,
receive an authorization response message in response to successful authorization of the standing instruction request by the issuer server, and
transmit the authorization response message along with the unique identifier to the acquirer server representing a setup of a standing instruction for the recurring payment transaction from the payment instrument of the user to the merchant account,
wherein the aggregator server, the acquirer server and the issuer server are different servers.

9. The aggregator server as claimed in claim 8, further caused at least in part to:
receive a payment transaction request for a subsequent recurring payment transaction from the acquirer server;
check if the payment transaction request comprises the plurality of unique data fields generated in accordance with an already setup standing instruction for the recurring payment transaction from the payment instrument to the merchant account;
determine validity of the plurality of unique data fields present in the payment transaction request to determine that the payment transaction request is associated with the standing instruction for the recurring payment transaction;
upon successful validation, access a database linked with the aggregator server, to retrieve the unique identifier associated with the recurring payment transaction; and
send the payment transaction request appended with the unique identifier to the issuer server, wherein the issuer server processes the subsequent recurring payment transaction from the payment instrument to the merchant account without additional authentication of the user by matching the unique identifier received from the aggregator server with a stored unique identifier accessible to the issuer server.

10. A computer-implemented method, comprising:
receiving, by an aggregator server associated with a payment network, a payment transaction request from an acquirer server associated with a merchant for performing a recurring payment transaction from a payment instrument of a user to a merchant account of the merchant;
checking if the payment transaction request comprises a plurality of unique data fields representing the recurring payment transaction based on a standing instruction;
checking, by the aggregator server, validity of the plurality of unique data fields to determine if the payment transaction request is associated with the recurring payment transaction based on the standing instruction that is already setup, wherein the validity of the plurality of unique data fields is determined based on matching values of the plurality of unique data fields with corresponding values stored in a database linked with the aggregator server;
upon successful validation, accessing the database linked with the aggregator server, to retrieve a unique identifier associated with the recurring payment transaction from the payment instrument to the merchant account; and sending, by the aggregator server, the payment transaction request including the unique identifier to an issuer server, wherein the issuer server processes the recurring payment transaction from the payment instrument to the merchant account without performing additional authentication of the user by matching the unique identifier received from the aggregator server with a stored unique identifier available with the issuer server, wherein the aggregator server is linked with a plurality of payment networks, and the payment instrument is associated with any of the plurality of payment networks.

* * * * *